(12) United States Patent
Nakatsugawa

(10) Patent No.: US 9,853,857 B2
(45) Date of Patent: Dec. 26, 2017

(54) SYSTEM, SWITCH DEVICE AND METHOD OF CONTROLLING A PLURALITY OF SWITCH DEVICES

(71) Applicant: FUJITSU LIMITED, Kawasaki-shi, Kanagawa (JP)

(72) Inventor: Keiichi Nakatsugawa, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 83 days.

(21) Appl. No.: 15/093,129

(22) Filed: Apr. 7, 2016

(65) Prior Publication Data

US 2016/0308710 A1    Oct. 20, 2016

(30) Foreign Application Priority Data

Apr. 20, 2015  (JP) ................. 2015-085883

(51) Int. Cl.
*H04L 12/24* (2006.01)
*H04L 12/26* (2006.01)
*H04L 12/703* (2013.01)

(52) U.S. Cl.
CPC ...... *H04L 41/0668* (2013.01); *H04L 43/0811* (2013.01); *H04L 43/10* (2013.01); *H04L 45/28* (2013.01); *H04L 43/026* (2013.01)

(58) Field of Classification Search
CPC . H04L 41/0668; H04L 43/0811; H04L 43/10; H04L 45/28
See application file for complete search history.

(56) References Cited

FOREIGN PATENT DOCUMENTS

| JP | 2011-160363 | 8/2011 |
| JP | 2011-244095 | 12/2011 |
| JP | 2014-135614 | 7/2014 |

OTHER PUBLICATIONS

"OpenFlow Switch Specification" Version 1.4.0 (Wire Protocol 0x05), *Open Networking Foundation*, ONF-TS-012, Oct. 14, 2013.

*Primary Examiner* — Ronald B Abelson
(74) *Attorney, Agent, or Firm* — Staas & Halsey LLP

(57) ABSTRACT

A switch apparatus includes a first controller, a second controller, and a plurality of switch devices, the plurality of switch devices being configured to receive a packet and store a flow table which indicates a method of handling a process of the received packet, wherein the first controller informs a first content of the flow table to the plurality of switch devices, a first switch device detects a communication error between the first switch device and the first controller, the first switch device informs a second switch device of the communication error, and the second switch device changes a connecting destination from the first controller to the second controller.

20 Claims, 21 Drawing Sheets

FIG. 6

| COUPLING SOURCE | COUPLING DESTINATION | ROUTE COST |
|---|---|---|
| OFC1 | SW1 | 1 |
| SW1 | OFC1 | 1 |
| SW1 | SW2 | 1 |
| SW2 | SW1 | 1 |
| SW1 | SW3 | 1 |
| SW3 | SW1 | 1 |
| SW2 | OFS1 | 1 |
| OFS1 | SW2 | 1 |
| SW2 | OFS2 | 1 |
| OFS2 | SW3 | 1 |
| SW3 | OFS3 | 1 |
| OFS3 | SW3 | 1 |
| SW3 | OFS4 | 1 |
| OFS4 | SW3 | 1 |
| SW3 | OFS5 | 1 |
| OFS5 | SW3 | 1 |
| SW3 | SW5 | 1 |
| SW5 | SW3 | 1 |
| OFC2 | SW4 | 1 |
| SW4 | OFC2 | 1 |
| SW4 | SW5 | 1 |
| SW5 | SW4 | 1 |
| SW4 | SW6 | 1 |
| SW6 | SW4 | 1 |
| SW5 | OFS6 | 1 |
| OFS6 | SW5 | 1 |
| SW5 | OFS7 | 1 |
| OFS7 | SW5 | 1 |
| SW6 | OFS8 | 1 |
| OFS8 | SW6 | 1 |
| SW6 | OFS9 | 1 |
| OFS9 | SW6 | 1 |

SYSTEM, SWITCH DEVICE AND METHOD OF CONTROLLING A PLURALITY OF SWITCH DEVICES

CROSS-REFERENCE TO RELATED APPLICATION

This application is based upon and claims the benefit of priority of the prior Japanese Patent Application No. 2015-085883, filed on Apr. 20, 2015, the entire contents of which are incorporated herein by reference.

FIELD

The embodiment disclosed herein relates to a system, a switch device and a method of controlling a plurality of switch devices.

BACKGROUND

In recent years, OpenFlow is known as a technology that can perform flexible packet transfer control that is not bounded by existing packet transfer or routing processing in which a known L2 switch, router or the like is used. OpenFlow is a technology that includes an OpenFlow controller (OFC) and an OpenFlow switch (OFS) and in which the OFC collectively manages route control and transfer control of a plurality of OFSs. The OFC sets, to each OFS, a flow table including match conditions for identifying a flow of a control target and information that defines a process to be execute such as, for example, transfer, disposal or field rewriting in the header for packets that satisfy the match conditions. It is to be noted that the flow table is set freely by an operation administrator of a network or a user and is set dynamically and programmably to each OFS using the OpenFlow protocol. Each OFS refers to the flow table to execute processing corresponding to a received packet.

In OpenFlow, in order to avoid a network disorder arising from a disorder of the OFC, the OFC is made redundant using a primary OFC and a secondary OFC. For example, the primary OFC monitors and controls a plurality of OFSs, and the secondary OFC monitors and controls the plurality of OFSs when the primary OFC suffers from a disorder. Meanwhile, each OFS periodically executes keepalive with the OFC that controls the own apparatus to detect a disorder of the OFC.

If each OFS detects a disorder of the primary OFC on the basis of a result of the monitoring of keepalive, then it switches the primary OFC to the secondary OFC. As a result, each OFS can recover the primary OFC from the disorder.

As examples of a prior art, Japanese Laid-open Patent Publication No. 2014-135614, Japanese Laid-open Patent Publication No. 2011-160363, Japanese Laid-open Patent Publication No. 2011-244095 and "OpenFlow Switch Specification Version 1.4.0," Oct. 14, 2013, OPEN NETWORKING FOUNDATION are known.

SUMMARY

According to an aspect of the invention, a switch apparatus includes a first controller, a second controller, and a plurality of switch devices, the plurality of switch devices being configured to receive a packet and store a flow table which indicates a method of handling a process of the received packet, wherein the first controller informs a first content of the flow table to the plurality of switch devices, a first switch device included in the plurality of switch devices detects a communication error between the first switch device and the first controller, the first switch device informs a second switch device included in the plurality of switch devices of the communication error between the first switch device and the first controller, and the second switch device changes a connecting destination from the first controller to the second controller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 depicts an example of control topology information;

DESCRIPTION OF EMBODIMENT

Each OFS executes keepalive with the primary OFC using a control plane. However, since the number of times of execution of keepalive by the OFC increases as the number of OFSs that are monitored and controlled by the OFC increases, also the processing burden on the OFC which may be required for keepalive increases. Besides, since keepalive is implemented by message communication on the control plane between the OFS and the OFC, as the number of OFSs increases, messages transferred on the control plane congest, and also the communication load on the control plane which may be required for keepalive increases.

According to one aspect, it is an object of the present invention to provide a switch apparatus, a control apparatus, a disorder detection method and a disorder detection program by which the communication load on a control plane and the processing burden on an OFC side when the OFC is detected are suppressed.

In the following, embodiments of a switch apparatus, a control apparatus, a disorder detection method and a disorder detection program disclosed herein are described in detail with reference to the accompanying drawings. It is to be noted that the disclosed technology shall not be restricted by the embodiments. Further, the embodiments described below may be combined suitably without causing a contradiction.

Embodiment 1

Figure 1:
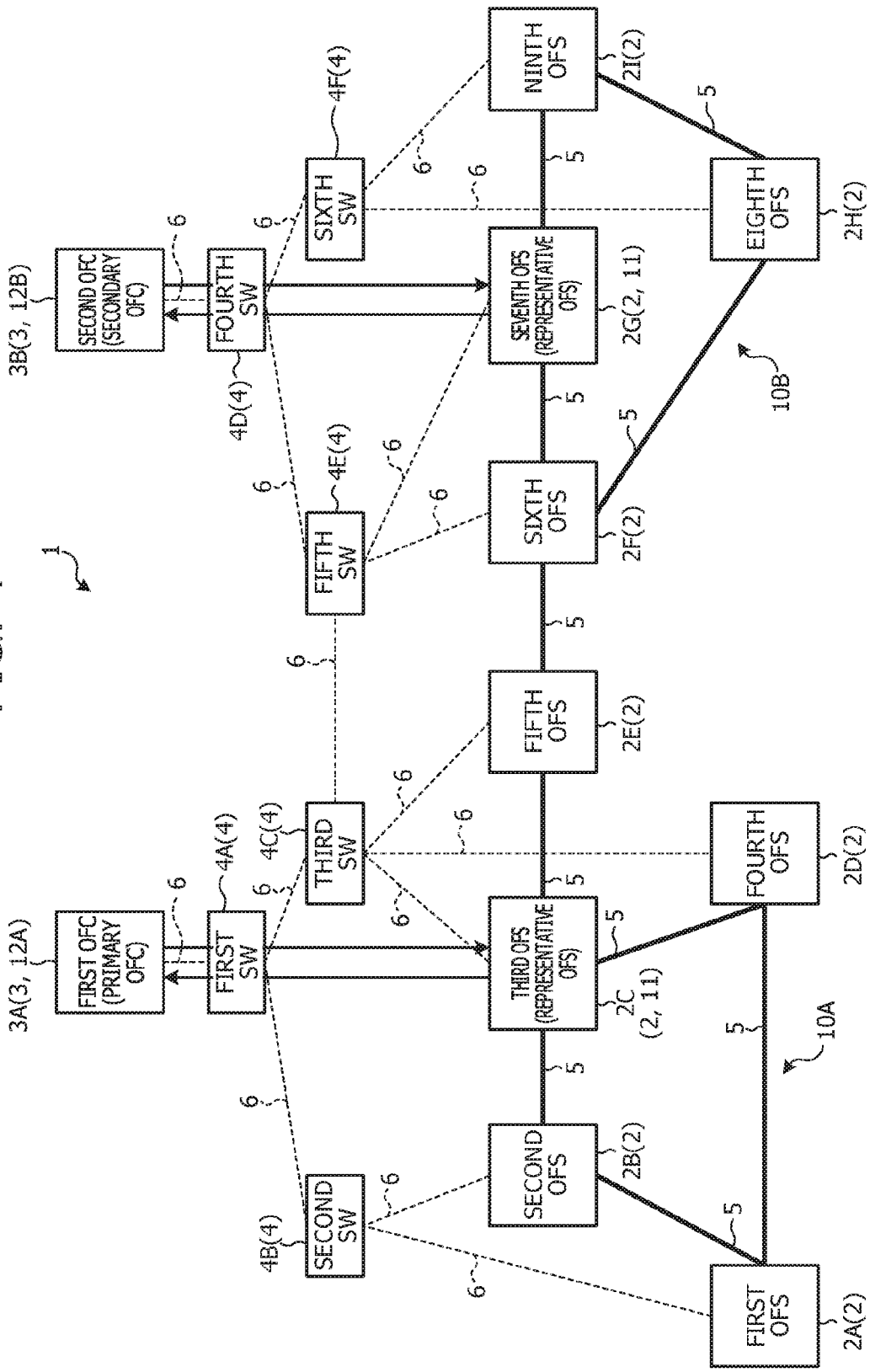
FIG. 1 depicts an example of a communication system of an embodiment 1.

FIG. 1 is an explanatory view depicting an example of a communication system 1 of an embodiment 1. The communication system 1 of FIG. 1 includes a plurality of OFSs 2, a plurality of OFCs 3, and a plurality of switches (SWs) 4. The plurality of OFSs 2 include, for example, a first OFS group 10A and a second OFS group 10B. The first OFS group 10A includes a first OFS 2A to a fifth OFS 2E, and the second OFS group 10B includes a sixth OFS 2F to a ninth OFS 2I. Each OFS 2 corresponds, for example, to a switch apparatus. The plurality of OFCs 3 include a first OFC 3A and a second OFC 3B. The first OFC 3A monitors and controls the first OFS 2A to the fifth OFS 2E in the first OFS group 10A. Meanwhile, the second OFC 3B monitors and controls the sixth OFS 2F to the ninth OFS 2I in the second OFS group 10B. Each OFC 3 corresponds, for example, to a control apparatus. The OFSs 2A to 2I are coupled to each other using a data plane 5 that is a first network and transmit and receive a data packet using the data plane 5.

The plurality of SWs 4 are, for example, layer 2 switches (L2 switches) and include a first SW 4A to a sixth SW 4F. Further, the first OFC 3A is coupled to the first OFS 2A to the fifth OFS 2E in the first OFS group 10A using the first SW 4A to the third SW 4C and a control plane 6. Meanwhile, the second OFC 3B is coupled to the sixth OFS 2F to the ninth OFS 2I in the second OFS group 10B using the fourth SW 4D to the sixth SW 4F and the control plane 6. The first OFC 3A and the second OFC 3B transmit and receive a control message to and from the first OFS group 10A and the second OFS group 10B using the control plane 6 that is a second network.

In the first OFS group 10A, the first OFC 3A serves as a primary OFC 12A and the second OFC 3B serves as a secondary OFC 12B, and in the second OFS group 10B, the second OFC 3B serves as a primary OFC 12A and the first OFC 3A serves as a secondary OFC 12B. The primary OFC 12A is an OFC 3 that is used in a normal state, and the secondary OFC 12B is an OFC 3 that is used when the primary OFC 12A is disordered. The third OFS 2C is determined as a representative OFS 11 in the first OFS group 10A, and the seventh OFS 2G is determined as a representative OFS 11 in the second OFS group 10B. The third OFS 2C periodically executes keepalive with the first OFC 3A using the control plane 6 to monitor the disorder of the first OFC 3A. The seventh OFS 2G periodically executes keepalive with the second OFC 3B using the control plane 6 to monitor the disorder of the second OFC 3B. In other words, since only the representative OFS 11 executes keepalive with the primary OFC 12A, the process burden which may be required for the keepalive on the primary OFC 12A side and the communication burden when keepalive is executed on the control plane 6 are suppressed.

Figure 2:
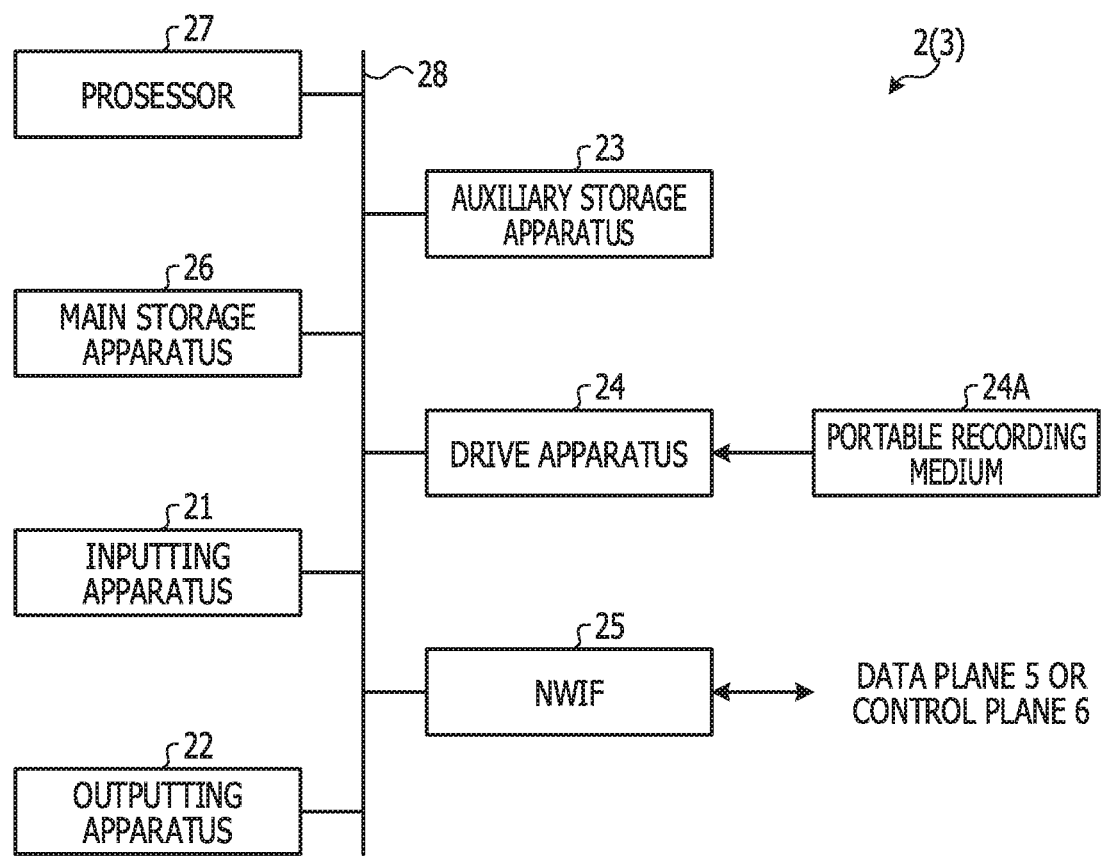
FIG. 2 depicts an example of a hardware configuration of an OFS.

FIG. 2 is a block diagram depicting an example of a hardware configuration of the OFS 2. It is to be noted that, although a hardware configuration of the OFS 2 is exemplified in FIG. 2 for the convenience of description, since also the OFC 3 has a same hardware configuration, like elements are denoted by like reference symbols and overlapping description of the like elements and operation of them is omitted herein to avoid redundancy. The OFS 2 depicted in FIG. 2 is a computer such as, for example, a general purpose server and includes an inputting apparatus 21, an outputting apparatus 22, an auxiliary storage apparatus 23, a drive apparatus 24, a network interface (NWIF) 25, a main storage apparatus 26, a processor 27 and a bus 28.

The inputting apparatus 21 is an input interface such as, for example, a keyboard or a pointing device such as a mouse. The outputting apparatus 22 outputs a result of processing of the processor 27. The outputting apparatus 22 is an output interface such as, for example, a sound outputting apparatus such as a speaker and/or a display apparatus.

The auxiliary storage apparatus 23 is an area for storing various programs and data to be used by the processor 27 in execution of the programs. The auxiliary storage apparatus 23 is a nonvolatile memory such as, for example, an erasable programmable read only memory (EPROM) or a hard disk drive. The auxiliary storage apparatus 23 retains various application programs such as, for example, an operating system (OS).

The drive apparatus 24 reads out programs or various data recorded on a portable recording medium 24A and outputs the programs or the data to the processor 27. The portable recording medium 24A is a recording medium such as, for example, a secure digital (SD) card, a mini SD card, a micro SD card, a universal serial bus (USB) flash memory, a compact disc (CD), a digital versatile disc (DVD) or a flash memory card.

The NWIF 25 is a communication interface that administers communication of information with an NW such as, for example, the data plane 5 or the control plane 6. The NWIF 25 includes a communication interface that couples to a wire NW or a wireless NW. The NWIF 25 is, for example, a network interface card (NIC) or a wireless local area network (LAN) card.

The main storage apparatus 26 is a semiconductor memory such as, for example, a random access memory (RAM) that corresponds to a storage area or a working area of the processor 27 that loads a program stored in the auxiliary storage apparatus 23.

The processor 27 is, for example, a central processing unit (CPU) that controls the entire OFS 2. The processor 27 loads the OS or various application programs retained in the auxiliary storage apparatus 23 or the portable recording medium 24A into the main storage apparatus 26 and executes the OS or the application programs to execute various processes. The number of such processors 27 is not limited to one but may be a plural number.

It is to be noted that, when data is inputted through the NWIF 25, the inputting apparatus 21 need not necessarily be provided. Similarly, when data is outputted through the NWIF 25, the outputting apparatus 22 need not necessarily be provided, for example, in the OFC 3 or the OFS 2.

Figure 3:
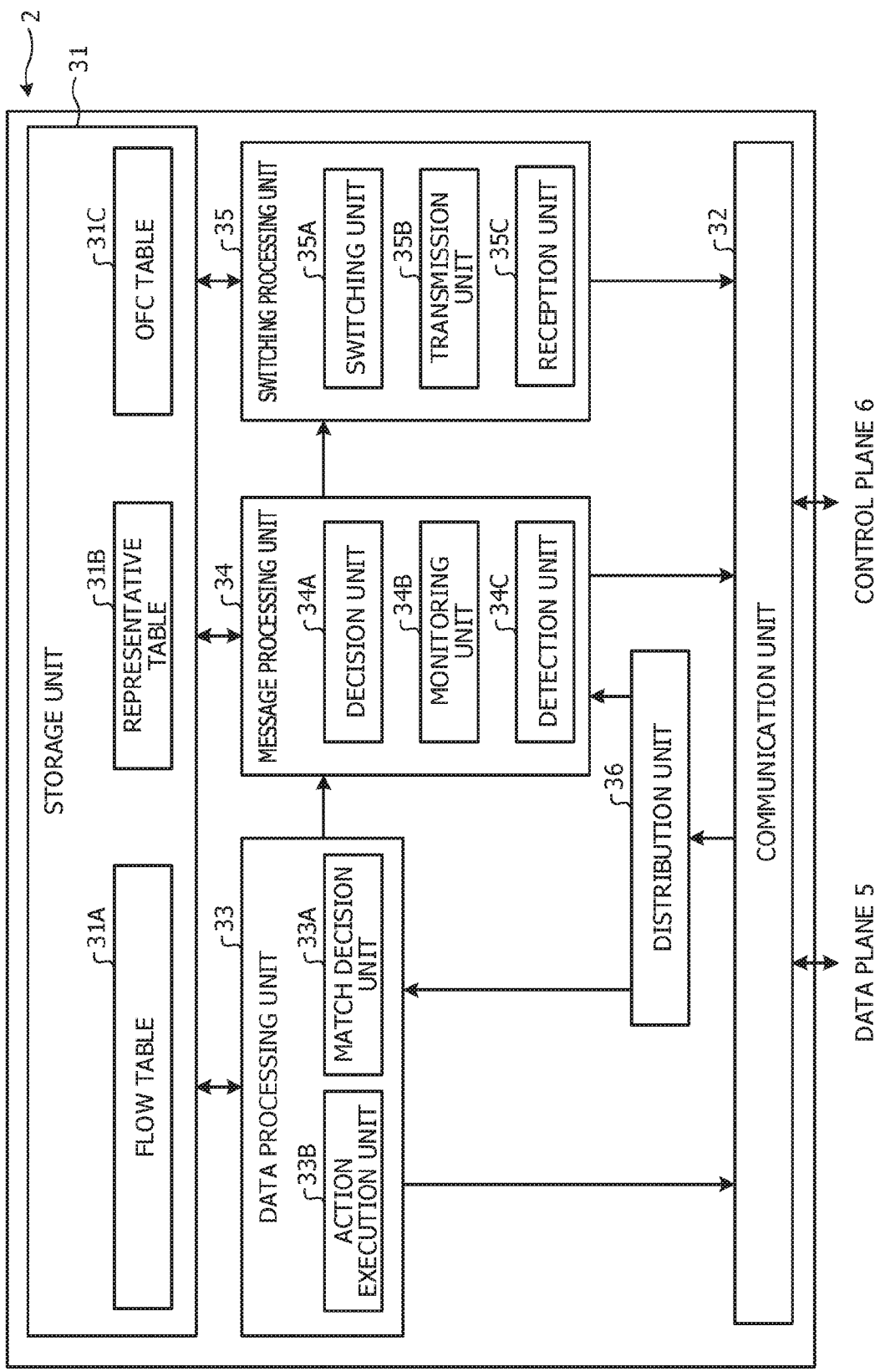
FIG. 3 depicts an example of a functional configuration of an OFS.

FIG. 3 is a block diagram depicting an example of a functional configuration of the OFS 2. The OFS 2 depicted in FIG. 3 includes a storage unit 31, a communication unit 32, a data processing unit 33, a message processing unit 34, a switching processing unit 35 and a distribution unit 36. The storage unit 31 corresponds, for example, to the auxiliary storage apparatus 23 and includes a flow table 31A, a representative table 31B and an OFC table 31C. The flow table 31A is a table in which flow information including match conditions for identifying a flow of a control target and information that defines a process to be execute such as, for example, transfer, disposal or field rewriting in the header for packets of a flow that satisfies the match conditions is stored. The flow table 31A may be set by reading in static information retained in the auxiliary storage apparatus 23 or may be set dynamically on the basis of a Flow Mod message from the OFC 3.

The representative table 31B manages a representative identifier for deciding whether or not the own apparatus is the representative OFS 11. It is to be noted that the representative OFS is, for example, the first switch apparatus. When the own apparatus is the representative OFS 11, the representative table 31B manages the representative identifier "1" but manages, when the own apparatus is not the representative OFS 11, the representative identifier "0." It is to be noted that the substance of the representative table 31B is set, for example, by setting in advance, by an inputting operation of an administrator through the inputting apparatus 21 or by a selection instruction from the OFC 3.

The OFC table 31C manages information of the identifier, address and so forth of the primary OFC 12A and the secondary OFC 12B that monitor and control the own apparatus.

The communication unit 32 corresponds, for example, to the NWIF 25 and transmits and receives data packets using the data plane 5 that couples to the other OFSs 2. The communication unit 32 transmits and receives an OpenFlow message using the control plane 6 coupling to the OFC 3.

The data processing unit 33 corresponds, for example, to a function of the processor 27, and refers to the substance of the flow table 31A, identifies a data packet received through the communication unit 32 and executes an action of the identified data packet. The data processing unit 33 includes a match decision unit 33A and an action execution unit 33B. The match decision unit 33A refers to the flow information of the flow table 31A to decide whether or not a data packet satisfies the match conditions. Further, the action execution unit 33B executes, when the data packet satisfies the match conditions, an action corresponding to the match conditions for the data packet.

The message processing unit 34 corresponds, for example, to a function of the processor 27, and sets the substance of the flow table 31A on the basis of a Flow Mod message from the OFC 3, and executes transmission of a Packet-in message to the OFC 3 on the basis of a notification from the data processing unit 33. The message processing unit 34 includes a decision unit 34A, a monitoring unit 34B, and a detection unit 34C. The decision unit 34A refers to the representative table 31B to decide whether or not the own apparatus is the representative OFS 11. If the own apparatus is the representative OFS 11, then the monitoring unit 34B executes keepalive of a short cycle with the primary OFC 12A. It is to be noted that the keepalive is implemented by communication of an Echo Request message (hereinafter referred to simply as Echo Request) and an Echo Reply message (hereinafter referred to simply as Echo Reply) with the primary OFC 12A.

The detection unit 34C transmits an Echo Request for keepalive for each transmission cycle to the primary OFC 12A. Further, the detection unit 34C starts up a reception waiting timer after transmission of the Echo Request and decides that the primary OFC 12A is normal if the detection unit 34C receives an Echo Reply from the primary OFC 12A before the reception waiting timer becomes up. Further, if the reception waiting timer becomes up before an Echo Reply is received, then the detection unit 34C increments the failure time number by +1. Then, when the failure time number reaches a given time number, the detection unit 34C decides that the primary OFC 12A is in disorder, and notifies the switching processing unit 35 of the disorder of the OFC 3.

The switching processing unit 35 corresponds, for example, to a function of the processor 27 and includes a switching unit 35A, a transmission unit 35B and a reception unit 35C. If the own apparatus is the representative OFS 11 and besides a disorder of the primary OFC 12A is detected from the detection unit 34C, then the switching unit 35A refers to the OFC table 31C to execute switching operation of the OFC 3. In particular, the switching unit 35A switches the primary OFC 12A and the secondary OFC 12B with each other, namely, switches the transmission control protocol (TCP) coupling and the secure channel of the own apparatus to the secondary OFC 12B.

If a disorder of the primary OFC 12A is detected, then the transmission unit 35B transmits, by flooding transmission, a disorder notification message (hereinafter referred to simply as disorder notification) including the identifier of a disordered OFC 3 to the data plane 5 through the communication unit 32. The reception unit 35C receives a disorder notification from a different OFS 2 using the data plane 5 through the communication unit 32.

Meanwhile, if the own apparatus is not the representative OFS 11 and besides a disorder notification is received from the representative OFS 11 or a different OFS 2, then the switching unit 35A decides whether or not the identifier of the disordered OFC 3 in the disorder notification is the identifier of the primary OFC 12A of the own apparatus. If the identifier of the disordered OFC 3 in the disorder notification is the identifier of the primary OFC 12A of the own apparatus, then the switching unit 35A switches the primary OFC 12A and the secondary OFC 12B.

The distribution unit 36 identifies a packet type of a packet received through the communication unit 32 and transfers the received packet to the data processing unit 33 if the received packet is a data packet. On the other hand, if the received packet is an OpenFlow message, then the distribution unit 36 transfers the received packet to the message processing unit 34.

Figure 4:
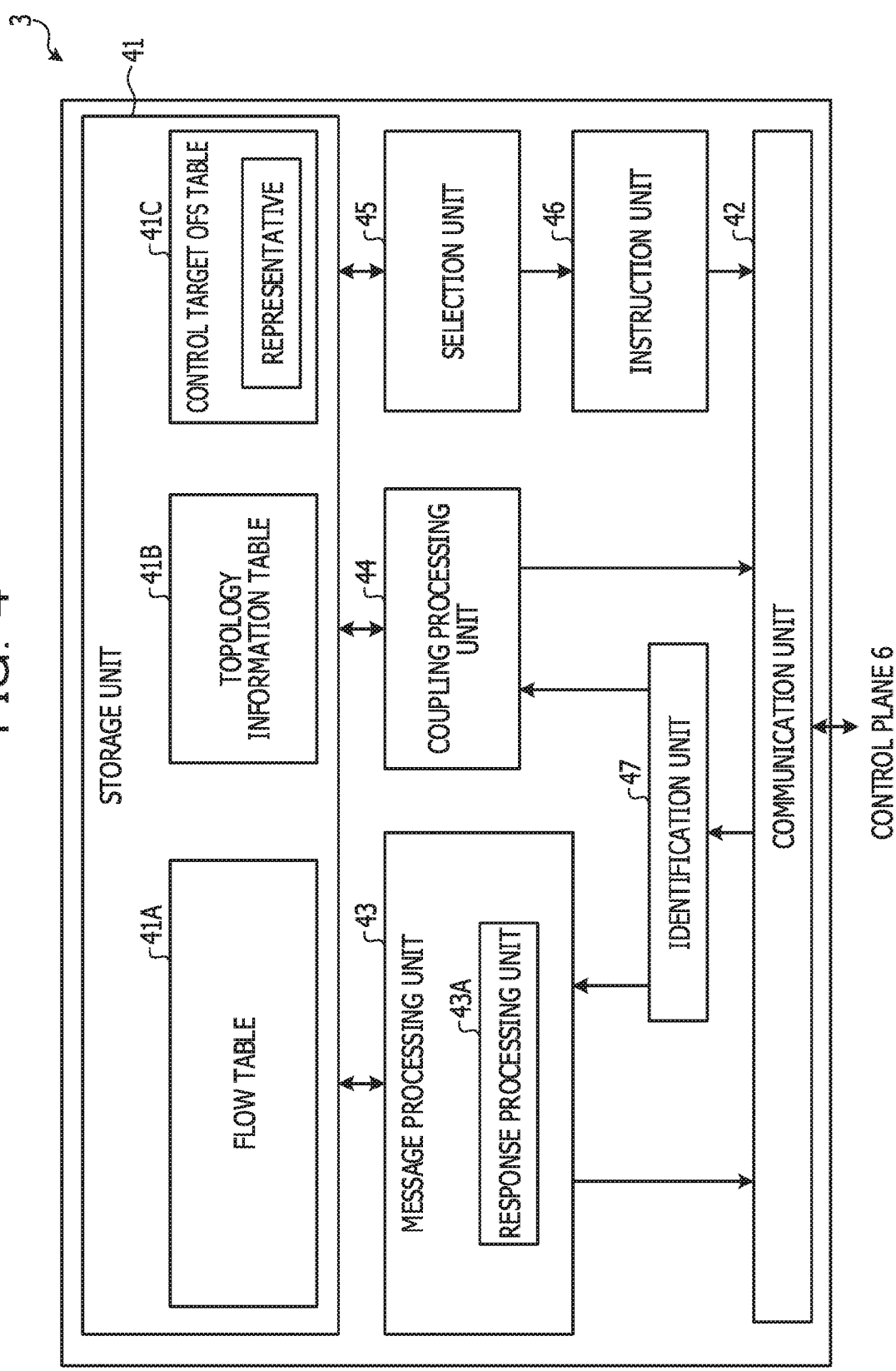
FIG. 4 depicts an example of a functional configuration of an OFC.

FIG. 4 is a block diagram depicting an example of a functional configuration of the OFC 3. The OFC 3 depicted in FIG. 4 includes a storage unit 41, a communication unit 42, a message processing unit 43, a coupling processing unit 44, a selection unit 45, an instruction unit 46 and an identification unit 47. The storage unit 41 corresponds, for example, to the auxiliary storage apparatus 23 and includes a flow table 41A, a topology information table 41B and a control target OFS table 41C.

The flow table 41A has flow information stored therein. The topology information table 41B is a table for managing topology information such as data topology information that is coupling topology on the data plane 5 and control topology information that is coupling topology on the control plane 6. It is to be noted that the topology information may be set by setting in advance, by an inputting operation by an administrator through the inputting apparatus 21, or by searching topology using, for example, the link layer discovery protocol (LLDP).

Figure 5:
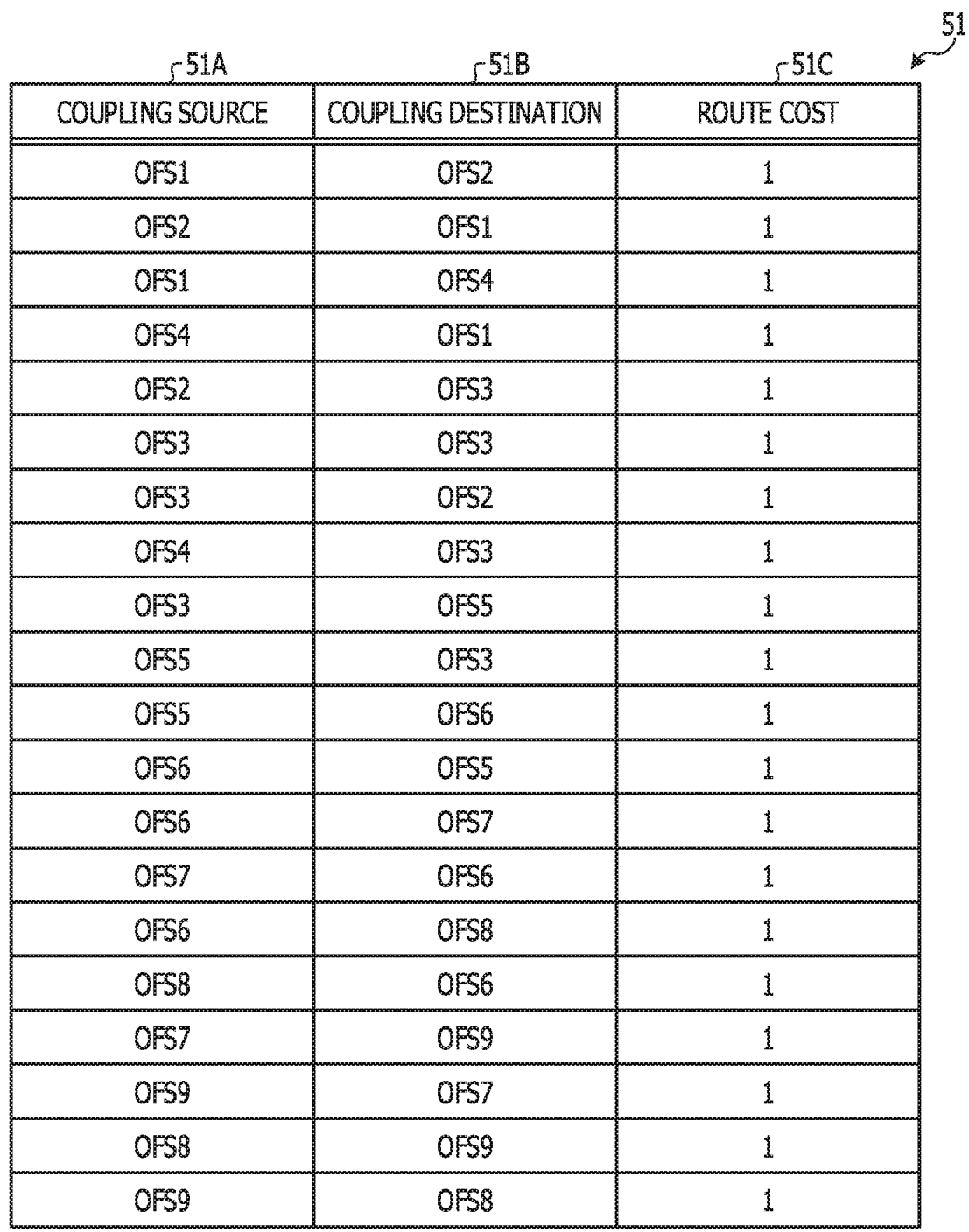
FIG. 5 depicts an example of data topology information.

FIG. 5 is an explanatory view depicting an example of data topology information. Data topology information 51 depicted in FIG. 5 manages coupling topology on the data plane 5 among the OFSs 2 and manages a route cost 51C in an associated relationship with each of the routes between a coupling source 51A and a coupling destination 51B.

FIG. 6 is an explanatory view depicting an example of control topology information. Control topology information 52 depicted in FIG. 6 manages coupling topology on control topology, for example, between the OFSs 2 and the OFCs 3, between the OFSs 2 and the SWs 4 and between the OFCs 3 and the SWs 4 and manages a route cost 52C in an associated relationship with each route between a coupling source 52A and a coupling destination 52B.

The control target OFS table 41C is a table for managing information of the identifier, address or the like for identifying an OFS 2 of a control target to be monitored and controlled by the own apparatus. Further, in the control target OFS table 41C, also whether or not the representative OFS 11 exists is managed for each OFS 2 of the control target in addition to and in association with the identifier and the address of the OFS 2 of the control target. The communication unit 42 corresponds, for example, to the NWIF 25 and couples to the control plane 6 to transmit and receive a message to be exchanged with an OFS 2.

The message processing unit 43 receives an OpenFlow message such as a Packet-in message from an OFS 2 through the communication unit 42 and transmits an OpenFlow message such as a Flow Mod message or a Packet-out message to an OFS 2. The message processing unit 43 executes a process corresponding to a received OpenFlow message. Further, the message processing unit 43 includes a response processing unit 43A. The response processing unit 43A returns, if an Echo Request is received, for example, from the representative OFS 11, an Echo Reply to the representative OFS 11 through the communication unit 42.

The coupling processing unit 44 accepts a request from an OFS 2, confirms identification information of the OFS 2 of the control target and establishes a secure channel with the OFS 2.

The selection unit 45 is a processor for selecting a representative OFS 11 from within the control target OFS table 41C. The selection unit 45 selects a representative OFS 11 on the basis of the topology information such as the data topology information and the control topology information from the control target OFS table 41C and stores the identifier and the address of the selected representative OFS 11 into the control target OFS table 41C. For example, the selection unit 45 selects, on the basis of the control topology information, an OFS 2 whose route cost on the control plane 6 to the primary OFC 12A is in the minimum as the representative OFS 11. Further, the instruction unit 46 instructs the OFS 2 selected by the selection unit 45 of operation transition of the representative OFS 11.

The identification unit 47 identifies a message received through the communication unit 42 and transfers, if the received message is an OpenFlow message from an OFS 2 on the basis of a result of the identification, the received message to the message processing unit 43. On the other hand, if the received message is a message relating to a request for TCP coupling or establishment of a secure channel, then the identification unit 47 transfers the received message to the coupling processing unit 44.

Figure 7:
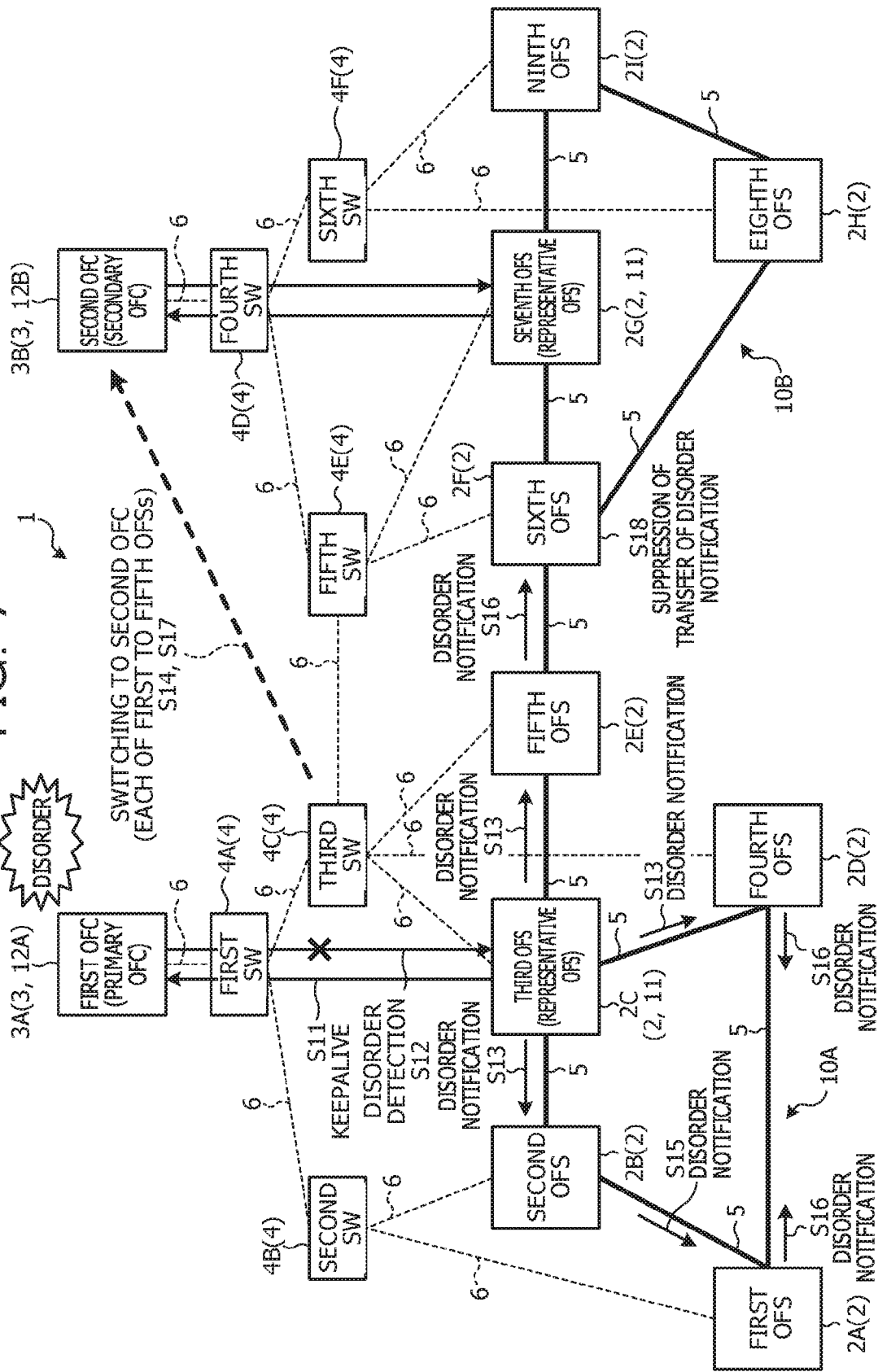
FIG. 7 illustrates an example of operation of a communication system of the embodiment 1 upon detection of a disorder.

Now, operation of the communication system 1 of the embodiment 1 is described. FIG. 7 is an explanatory view illustrating an example of operation of the communication system 1 of the embodiment 1 upon detection of a disorder. It is to be noted that, for the convenience of description, it is assumed that, in the first OFS group 10A of the first OFS 2A to the fifth OFS 2E, the first OFC 3A serves as the primary OFC 12A and the second OFC 3B serves as the secondary OFC 12B. Further, it is assumed that, in the second OFS group 10B of the sixth OFS 2F to the ninth OFS 2I, the second OFC 3B serves as the primary OFC 12A and the first OFC 3A serves as the secondary OFC 12B. Also it is assumed that, in the first OFC 3A, the third OFS 2C serves as the representative OFS 11 and, in the second OFC 3B, the seventh OFS 2G serves as the representative OFS 11.

Since the third OFS 2C serves as the representative OFS 11, the third OFS 2C executes keepalive with the first OFC 3A through the first SW 4A and the third SW 4C on the control plane 6 (step S11). The third OFS 2C detects a disorder of the first OFC 3A on the basis of a result of the keepalive with the first OFC 3A (step S12). If a disorder of the first OFC 3A is detected, then the third OFS 2C transmits a disorder notification indicative of the disorder of the first OFC 3A by flooding transmission to neighboring ones of the OFSs 2 using the data plane 5 (step S13). Then, the third OFS 2C switches the primary OFC 12A from the first OFC 3A to the second OFC 3B using the control plane 6 (step S14).

Further, if a disorder notification is received from the third OFS 2C, then the second OFS 2B refers to the OFC table 31C. Then, since the first OFC 3A in the disorder notification is the primary OFC 12A of the own apparatus, the second OFS 2B transmits a disorder notification by flooding transmission to the neighboring OFSs 2 using the data plane 5 (step S15). It is to be noted that also the first OFS 2A, fourth OFS 2D and fifth OFS 2E similarly refer to the OFC table 31C and decide that the disordered OFC 3 in the disorder notification is the primary OFC 12A of the own apparatus. Accordingly, the first OFS 2A, fourth OFS 2D and fifth OFS 2E transmit the disorder notification by flooding transmission to neighboring ones of the OFSs 2 using the data plane 5 (step S16). Each of the OFSs 2 switches, if the first OFC 3A in the disorder notification is the primary OFC 12A in the own apparatus, the primary OFC 12A from the first OFC 3A to the second OFC 3B (step S17).

It is to be noted that, since the primary OFC 12A of the own apparatus for the sixth OFS 2F is the second OFC 3B, the identifier of the disordered OFC 3 in the disorder notification from the fifth OFS 2E is different from that of the primary OFC 12A of the own apparatus. Accordingly, the sixth OFS 2F suppresses transfer of the disorder notification from the fifth OFS 2E (step S18). It is to be noted that, although the case in which the fifth OFS 2E transmits a disorder notification by flooding transmission is exemplified in FIG. 7, since, in the first place, the sixth OFS 2F uses the second OFC 3B as the primary OFC 12A, the fifth OFS 2E may be configured so as not to transfer the disorder notification to the sixth OFS 2F.

Further, since the seventh OFS 2G is the representative OFS 11, the seventh OFS 2G regularly executes keepalive with the second OFC 3B using the control plane 6.

Figure 8:
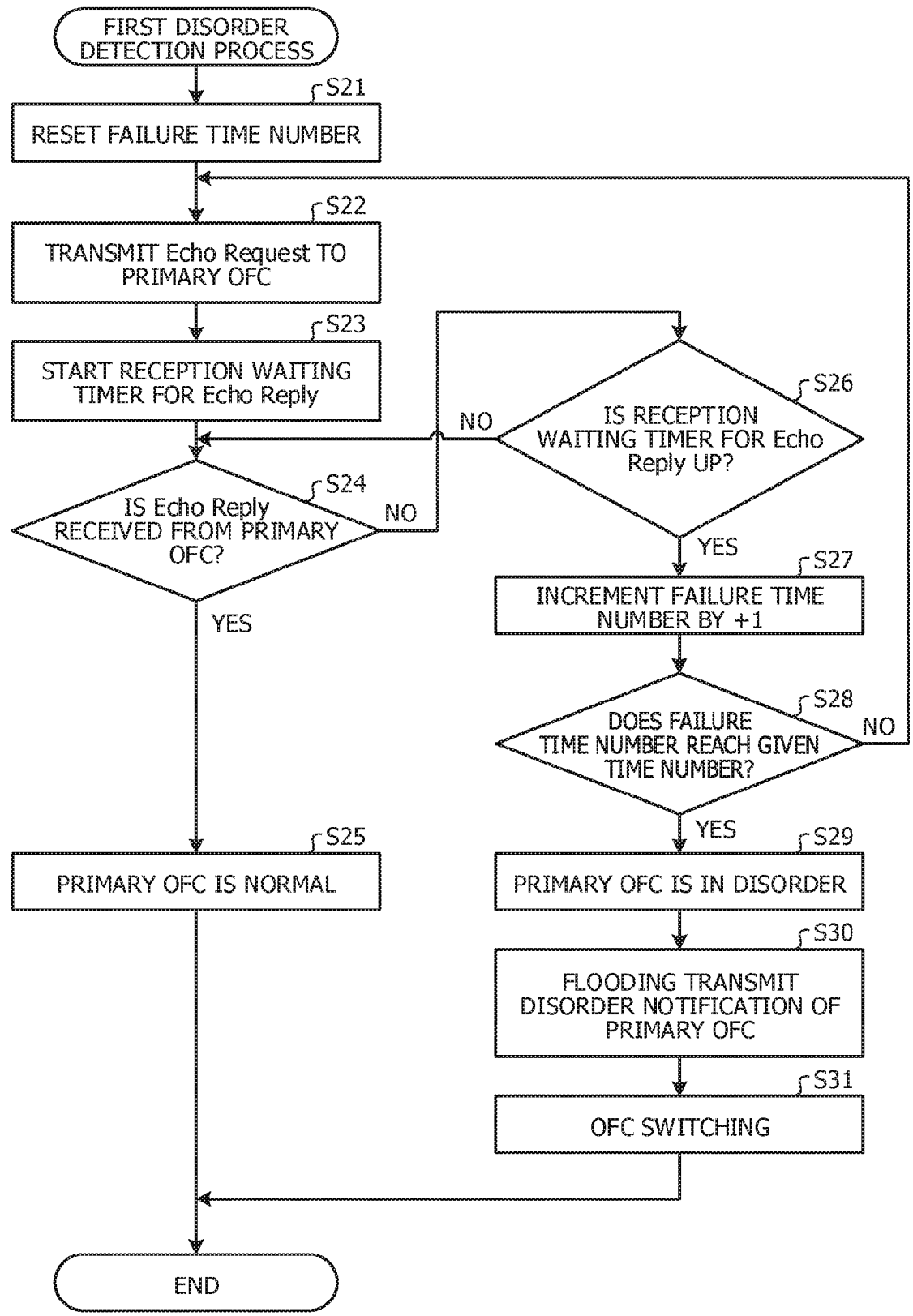
FIG. 8 is a flow chart illustrating an example of processing operation of a representative OFS relating to a first disorder detection process.

FIG. 8 is a flow chart illustrating an example of processing operation of the representative OFS 11 relating to a first disorder detection process. In the first disorder detection process depicted in FIG. 8, the representative OFS 11 executes keepalive with the primary OFC 12A and transmits, when a disorder of the primary OFC 12A is detected, a disorder notification by flooding transmission and then switches the primary OFC 12A to the secondary OFC 12B.

Referring to FIG. 8, the monitoring unit 34B in the representative OFS 11 resets the failure time number of the Echo Reply (step S21) and transmits an Echo Request for keepalive to the primary OFC 12A of the own apparatus using the control plane 6 (step S22). After the transmission of the Echo Request, the detection unit 34C starts the reception waiting timer for the Echo Reply (step S23) and decides whether or not an Echo Reply is received from the primary OFC 12A (step S24). If an Echo Reply is received (Yes at step S24), then the detection unit 34C decides that the primary OFC 12A is normal (step S25), thereby ending the processing operation depicted in FIG. 8. As a result, the representative OFS 11 recognizes that the primary OFC 12A is normal.

If an Echo Reply is not received from the primary OFC 12A (No at step S24), then the detection unit 34C decides whether or not the reception waiting timer for the Echo Reply is up (step S26). If the reception waiting timer is up (Yes at step S26), then the detection unit 34C increments the failure time number by +1 (step S27) and decides whether or not the failure time number reaches a given time number (step S28).

If the failure time number reaches the given time number (Yes at step S28), then the detection unit 34C decides that the primary OFC 12A is in disorder (step S29). As a result, the representative OFS 11 recognizes the disorder of the primary OFC 12A. The transmission unit 35B in the representative OFS 11 transmits a disorder notification of the primary OFC 12A by flooding transmission (step S30). Further, the switching unit 35A in the representative OFS 11 executes switching operation of the OFC 3 after the flooding transmission of the disorder notification (step S31) and ends the processing operation depicted in FIG. 8. As a result, the representative OFS 11 performs recovery from the disorder by switching the secondary OFC 12B to the primary OFC 12A.

On the other hand, if the reception waiting timer is not up (No at step S26), then the detection unit 34C advances its processing to step S24 in order to decide whether or not an Echo Reply is received from the primary OFC 12A. If the failure time number does not reach the given time number (No at step S28), then the monitoring unit 34B advances the processing to step S22 in order to transmit the Echo Request to the primary OFC 12A again.

The representative OFS 11 that executes the first disorder detection process depicted in FIG. 8 executes keepalive with the primary OFC 12A. As a result, the processing burden which may be required for the keepalive on the primary OFC 12A side and the communication load on the control plane 6 which may be required for the keepalive are suppressed.

If the representative OFS 11 receives an Echo Reply before the reception waiting timer becomes up, then the representative OFS 11 decides that the primary OFC 12A is normal. As a result, the representative OFS 11 recognizes that the primary OFC 12A is normal.

If the failure time number reaches the given time number, then the representative OFS 11 decides that the primary OFC 12A is in disorder. As a result, the representative OFS 11 recognizes the disorder of the primary OFC 12A.

If the representative OFS 11 detects a disorder of the primary OFC 12A, then the representative OFS 11 transmits a disorder notification including the identifier for identifying the disordered primary OFC 12A by flooding transmission. As a result, the representative OFS 11 informs the other OFSs 2 of occurrence of the disorder of the primary OFC 12A.

Further, if each OFS 2 receives the disorder notification, then the OFS 2 compares the identifier of the primary OFC 12A of the disorder notification and the identifier of the primary OFC 12A, by which the own apparatus is controlled, with each other to decide whether or not the primary OFC 12A of the own apparatus is in disorder. Further, if the OFS 2 decides that the primary OFC 12A of the own apparatus is in disorder, then the OFS 2 transmits the disorder notification to the neighboring OFSs 2 by flooding transmission. As a result, each OFS 2 informs the disorder of the primary OFC 12A of the own apparatus. Further, if each OFS 2 decides that the primary OFC 12A of the own apparatus is in disorder, then the OFS 2 switches from the primary OFC 12A to the secondary OFC 12B to recover the OFC 3, which monitors and controls the own apparatus, from the disorder.

On the other hand, if the received disorder notification does not indicate a disorder of the primary OFC 12A of the own apparatus, then each OFS 2 suppresses transfer of the disorder notification. As a result, the OFS 2 suppresses the communication load on the control plane 6 by avoiding transfer of a useless disorder notification relating to the components other than the primary OFC 12A of the own apparatus.

Figure 9:
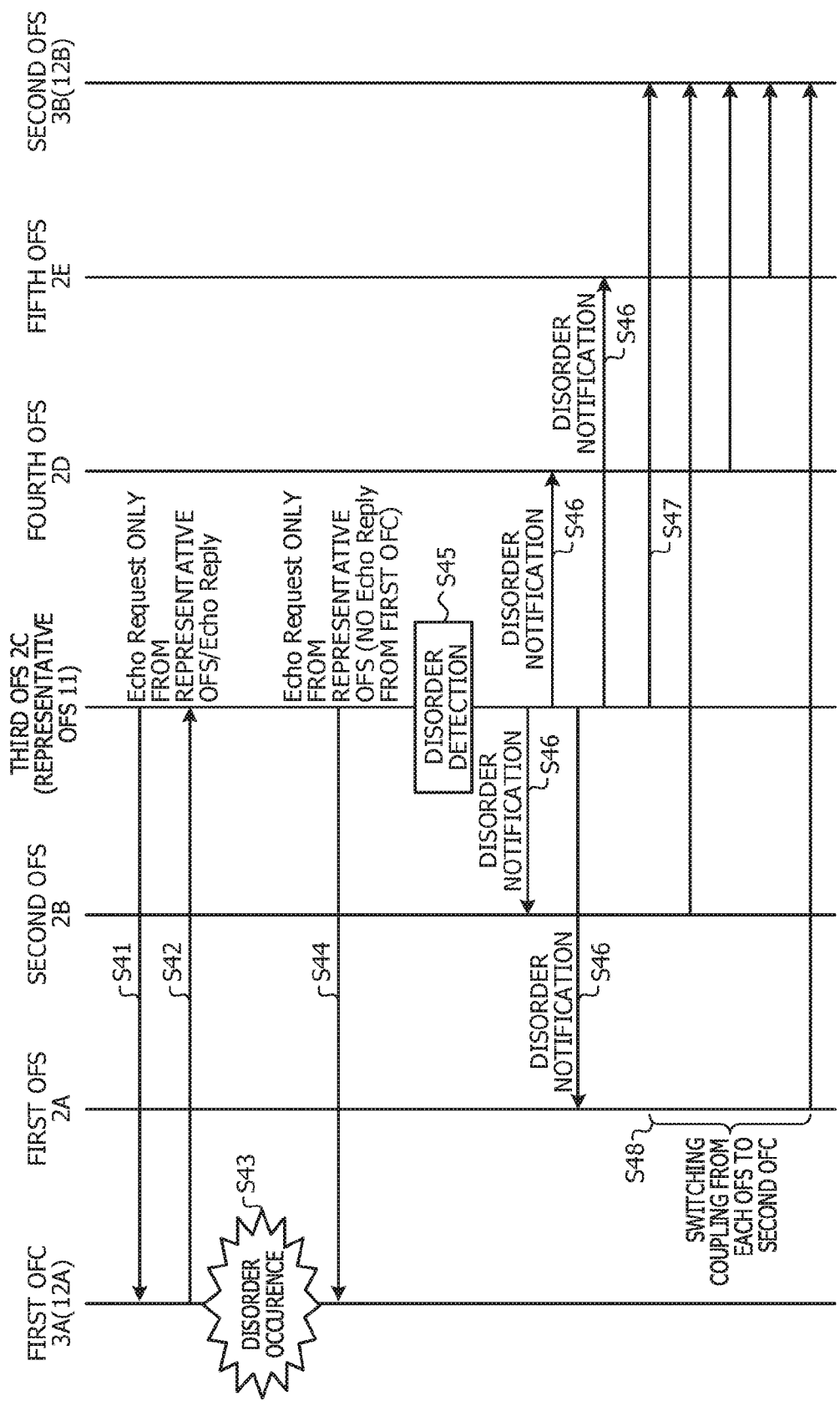
FIG. 9 is a sequence diagram illustrating an example of processing operation of OFCs and OFSs of a communication system relating to a first disorder detection process.

FIG. 9 is a sequence diagram illustrating an example of processing operation of the OFSs 2 and the OFCs 3 of the communication system 1 relating to the first disorder detection process. It is to be noted that the third OFS 2C serves as the representative OFS 11; the first OFC 3A serves as the primary OFC 12A; and the second OFC 3B serves as the secondary OFC 12B.

The third OFS 2C of the representative OFS 11 transmits an Echo Request to the first OFC 3A in order to execute keepalive with the first OFC 3A (step S41). When the Echo Request is received, the first OFC 3A returns an Echo Reply to the third OFS 2C (step S42). Here, it is assumed that a disorder occurs with the first OFC 3A now (step S43). At this time, the third OFS 2C transmits an Echo Request to the first OFC 3A at a next execution timing of keepalive (step S44). However, since the first OFC 3A suffers from a disorder, it is difficult for the first OFC 3A to return an Echo Reply to the Echo Request to the third OFS 2C. As a result, it is difficult for the third OFS 2C to receive an Echo Reply to the Echo Request and the third OFS 2C comes to detect a disorder of the first OFC 3A (step S45).

When the third OFS 2C detects the disorder of the first OFC 3A, the third OFS 2C transmits a disorder notification for the notification of the disorder of the first OFC 3A by flooding transmission to the first OFS 2A, second OFS 2B, fourth OFS 2D and fifth OFS 2E (step S46). Then, since the disorder of the first OFC 3A has been detected, the third OFS 2C switches the primary OFC 12A from the first OFC 3A to the second OFC 3B (step S47). Since the first OFS 2A, second OFS 2B, fourth OFS 2D and fifth OFS 2E have received the disorder notification of the disorder of the first OFC 3A, they execute switching operation of the OFC 3 from the first OFC 3A to the second OFC 3B (step S48), thereby ending the processing operation depicted in FIG. 9.

In the embodiment 1, only the representative OFS 11 regularly executes keepalive with the primary OFC 12A and transmits, when a disorder of the primary OFC 12A is detected on the basis of a result of the keepalive, a disorder notification to the other OFSs 2 by flooding transmission. In order words, by restricting the keepalive with the primary OFC 12A to the representative OFS 11, the processing load on the primary OFC 12A side which may be required for the keepalive and the communication load which may be required for the keepalive on the control plane 6 are suppressed.

If the representative OFS 11 detects a disorder of the primary OFC 12A, then the representative OFS 11 switches the primary OFC 12A to the secondary OFC 12B. Further, if each OFS 2 receives a disorder notification, then if the identifier of the disordered OFC 3 in the disorder notification is the identifier of the primary OFC 12A of the own apparatus, then the OFS 2 switches the primary OFC 12A to the secondary OFC 12B. As a result, also when a disorder is detected in the primary OFC 12A, the OFC 3 that controls the own apparatus is recovered from the disorder by switching from the primary OFC 12A to the secondary OFC 12B.

It is to be noted that, if the representative OFS 11 in the embodiment 1 detects a disorder of the primary OFC 12A, then the representative OFS 11 transmits a disorder notification by flooding transmission. However, the transmission is not limited to the flooding transmission, but the table may be set such that an OFS or OFSs 2 to which a disorder notification is to be transmitted are set in advance and a disorder notification is issued only to the set OFS or OFSs 2.

In the embodiment 1 described above, it is a typical cause of failure in keepalive of the representative OFS 11 that the primary OFC 12A itself suffers from a disorder and it is difficult for the primary OFC 12A to return an Echo Reply as described hereinabove. However, as another cause, although the primary OFC 12A is not in disorder, a link on the control plane 6 or a SW 4 between the primary OFC 12A and the representative OFS 11 may possibly be disordered. Also in this case, since it is originally difficult for the Echo Request from the representative OFS 11 to reach the primary OFC 12A and it is difficult for the representative OFS 11 to receive an Echo Reply similarly, the representative OFS 11 comes to decide that the primary OFC 12A is in disorder.

However, a disorder of the primary OFC 12A itself and link down on the control plane 6 may be isolated from each other. In this case, an embodiment in which a sub representative OFS is provided in addition to the representative OFS 11 to isolate causes of occurrence of a disorder from each other is described below as an embodiment 2.

Embodiment 2

Figure 10:
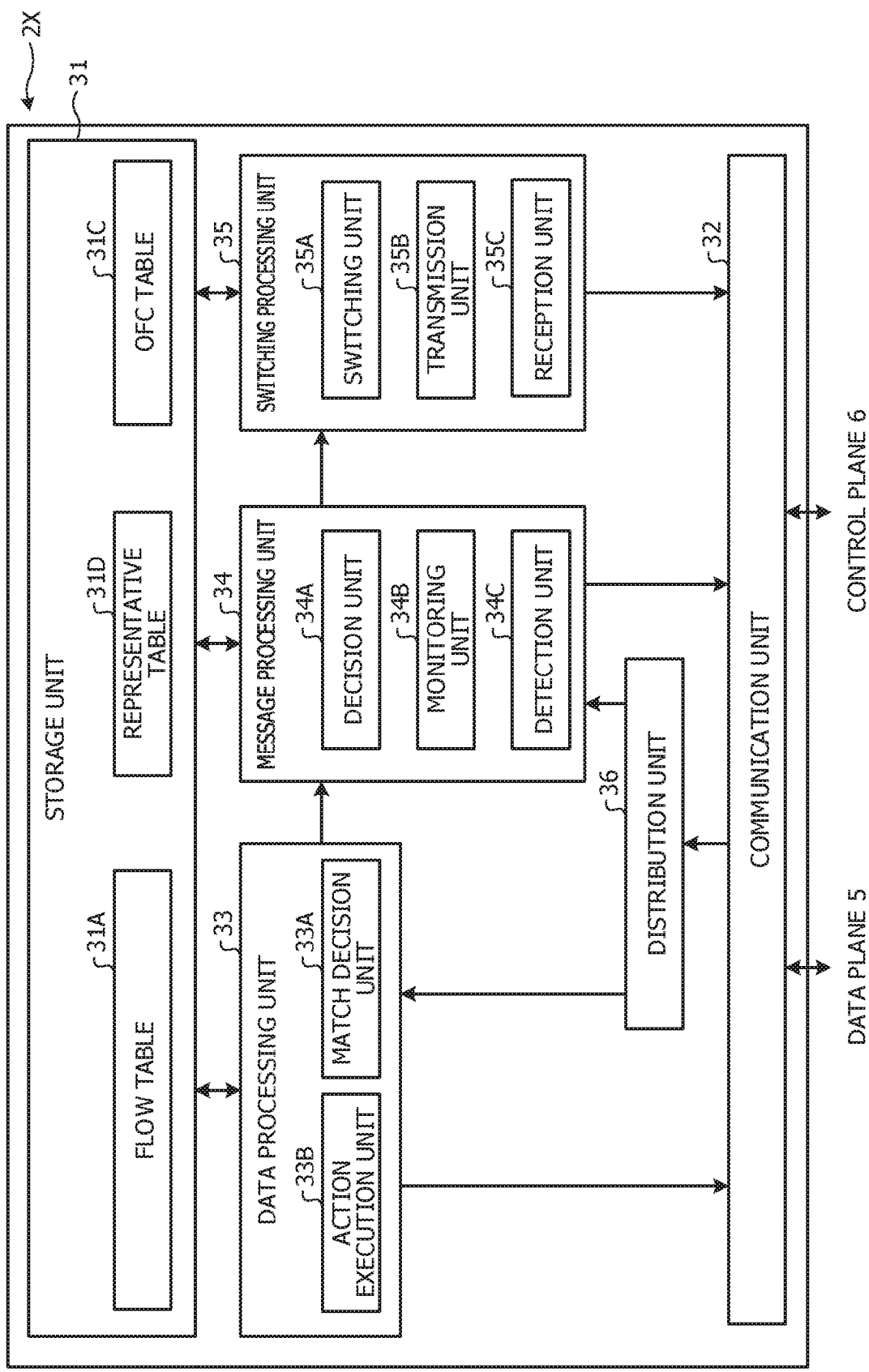
FIG. 10 depicts an example of a functional configuration of an OFS in an embodiment 2.

FIG. 10 is a block diagram depicting an example of a functional configuration of an OFS 2X of the embodiment 2. It is to be noted that like elements to those of the OFS 2 of the embodiment 1 depicted in FIG. 3 are denoted by like reference symbols, and overlapping description of the elements and operation of them is omitted.

Figure 13:
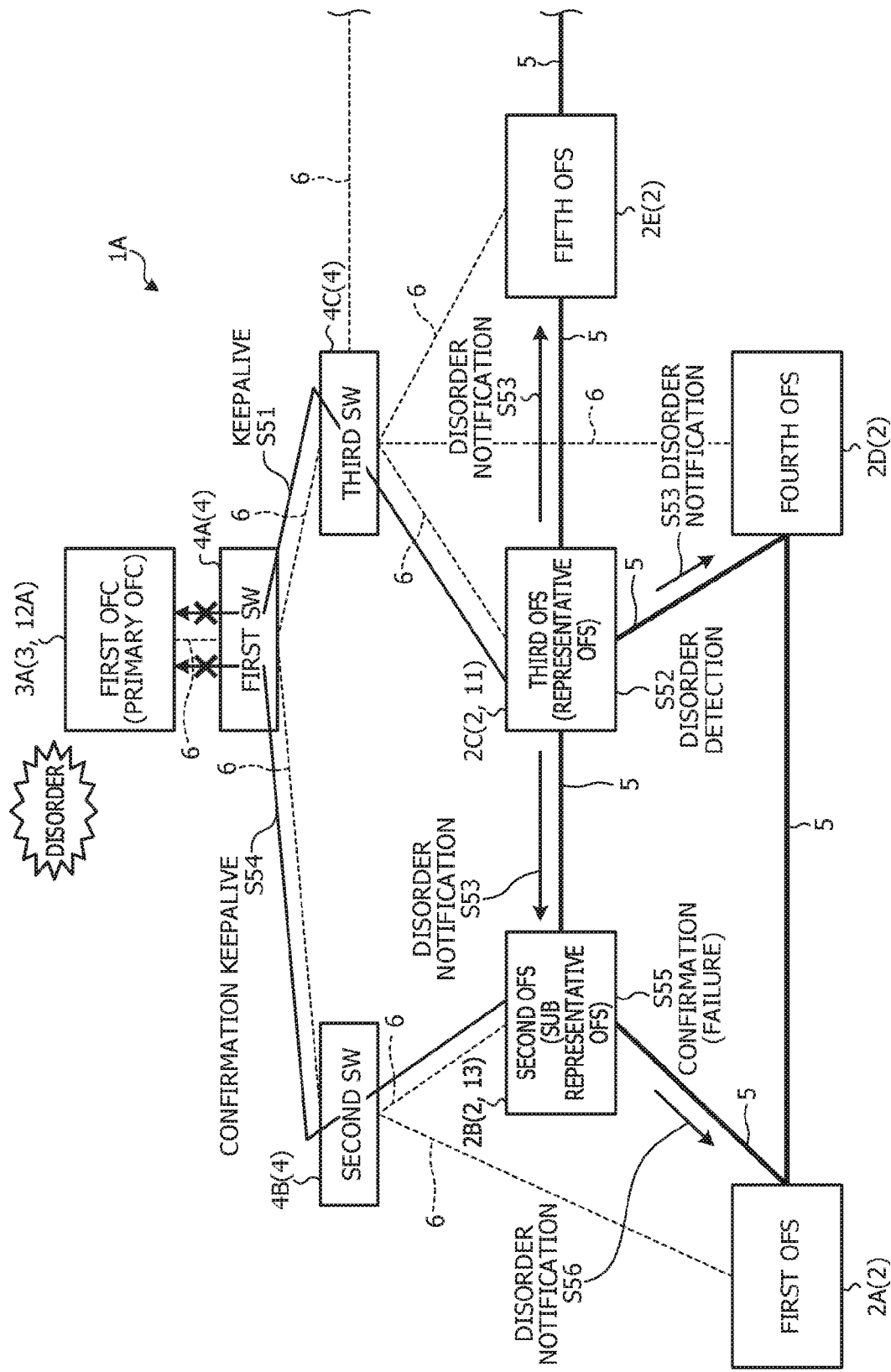
FIG. 13 depicts an example of operation upon failure in confirmation keepalive of a sub representative OFS in a communication system of the embodiment 2.

A communication system 1A of the embodiment 2 is different from the communication system 1 of the embodiment 1 in that the communication system 1A includes a sub representative OFS 13 depicted in FIG. 13 in addition to the representative OFS 11. It is to be noted that the sub representative OFS 13 corresponds, for example, to a second switch apparatus. Further, the OFS 2X depicted in FIG. 10 is different from the OFS 2 depicted in FIG. 3 in that the OFS 2X has a representative table 31D built therein. The representative table 31D manages a representative identifier for identifying whether the own apparatus is the representative OFS 11, the sub representative OFS 13 or any other OFS. In the representative table 31D, where the own apparatus is the representative OFS 11, the representative identifier is "1"; where the own apparatus is the sub representative OFS 13, the representative identifier is "2"; and where the own apparatus is an OFS 2 other than the representative OFS 11 and the sub representative OFS 13, the representative identifier is "0."

The decision unit 34A refers to the representative table 31D to decide whether or not the own apparatus is the representative OFS 11 and decide whether or not the own apparatus is the sub representative OFS 13. The monitoring unit 34B in the sub representative OFS 13 executes, when the own apparatus is the sub representative OFS 13 and receives a disorder notification of the primary OFC 12A through the reception unit 35C, confirmation keepalive for the primary OFC 12A. It is to be noted that the confirmation keepalive is a kind of keepalive that is executed between the sub representative OFS 13 and the primary OFC 12A. The monitoring unit 34B in the sub representative OFS 13 transmits an Echo Request for confirmation keepalive to the primary OFC 12A. The detection unit 34C in the sub representative OFS 13 starts up the reception waiting timer for the Echo Reply after the transmission of the Echo Request, and decides, if the detection unit 34C receives an Echo Reply from the primary OFC 12A before the reception waiting timer becomes up, that the confirmation keepalive results in success. On the other hand, if the reception waiting timer becomes up before an Echo Reply is received, the detection unit 34C increments the failure time number by +1. Then, if the failure time number reaches a given time number, then the detection unit 34C decides that the confirmation keepalive results in failure and notifies the switching processing unit 35 of the disorder of the OFC 3. If the transmission unit 35B in the sub representative OFS 13 decides that the confirmation keepalive results in failure, then the transmission unit 35B notifies the OFS 2, to which a disorder notification has not been transmitted, of a disorder notification indicative of the disorder of the primary OFC 12A.

Figure 11:
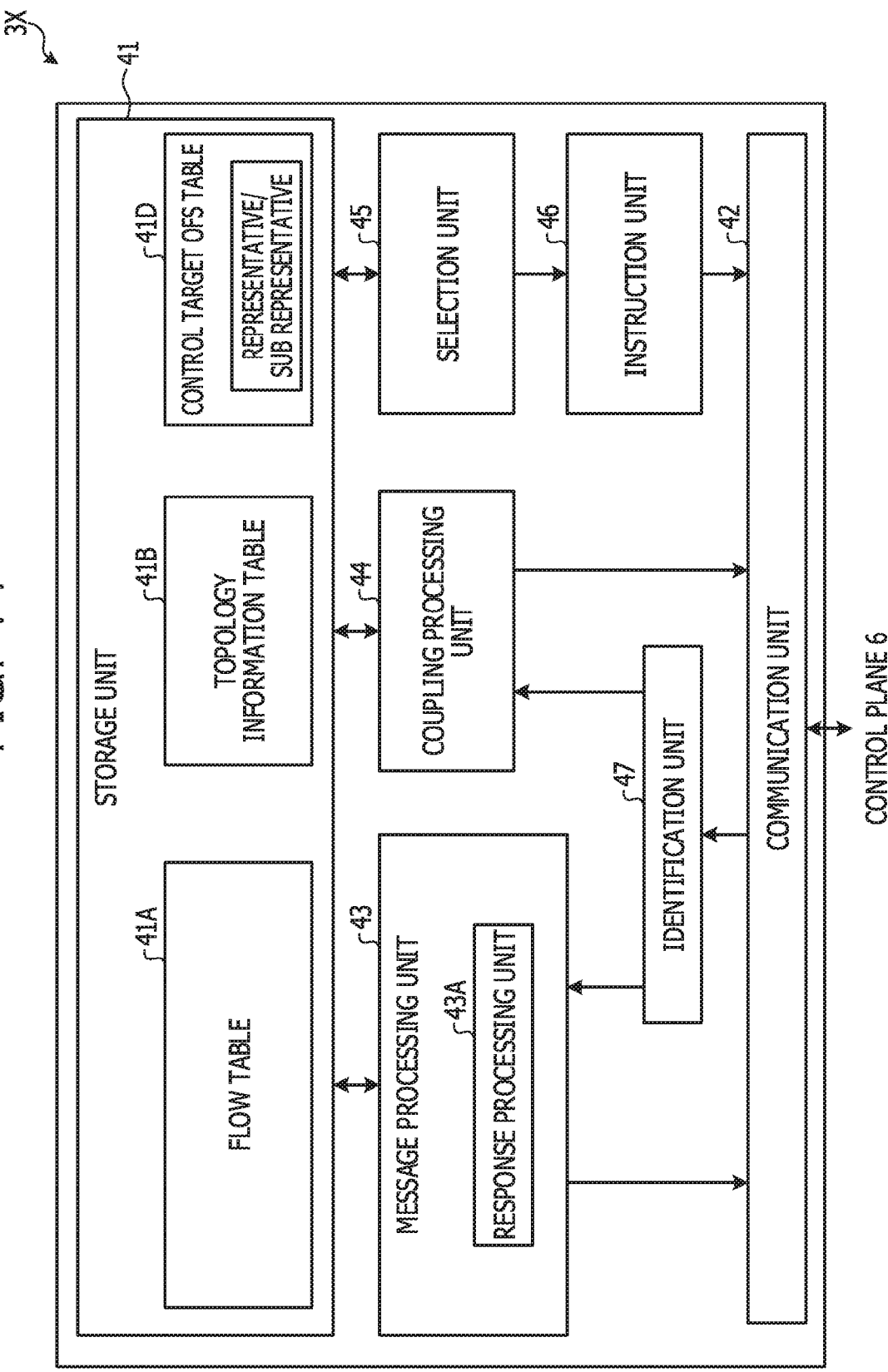
FIG. 11 depicts an example of a functional configuration of an OFC in the embodiment 2.

FIG. 11 is a block diagram depicting an example of a functional configuration of an OFC 3X in the embodiment 2. It is to be noted that, like elements to those of the OFC 3 of the embodiment 1 depicted in FIG. 4 are denoted by like reference symbols and overlapping description of the like elements and operation of them is omitted herein to avoid redundancy. The OFC 3X depicted in FIG. 11 is different from the OFC 3 depicted in FIG. 4 in that the OFC 3X manages the identifier and the address of the sub representative OFS 13 in addition to the identifier and the address of the representative OFS 11 in a control target OFS table 41D. In the control target OFS table 41D, also whether or not there exist a representative OFS 11 and a sub representative OFS 13 is managed for each OFS 2 of the control target in an associated relationship in addition to the identifier and the address of the OFSs 2 of the control target.

The selection unit 45 extracts a pair of neighboring OFSs 2 from the control target OFS table 41D. It is to be noted that the selection unit 45 extracts, for example, on the basis of the control topology information, a pair of OFSs 2 that are small in the hop number on the control plane 6 to the primary OFC 12A or in the distance to the primary OFC 12A. Alternatively, the selection unit 45 extracts, on the basis of the data topology information, a pair of OFSs 2 at or in the neighborhood of the center of all OFSs 2 on the data plane 5. The selection unit 45 checks, on the basis of the control topology information, a route from the extracted pair of OFSs 2 to the primary OFC 12A and selects the pair of OFSs 2 that have different routes as the representative OFS 11 and the sub representative OFS 13. It is to be noted that the selection unit 45 may select, from between the paired OFSs 2, for example, the OFS 2 whose route hop number is smaller from the primary OFC 12A as the representative OFS 11. The instruction unit 46 instructs one and the other of the pair of OFSs 2 selected by the selection unit 45 to operate as the representative OFS 11 and the sub representative OFS 13, respectively.

Figure 12:
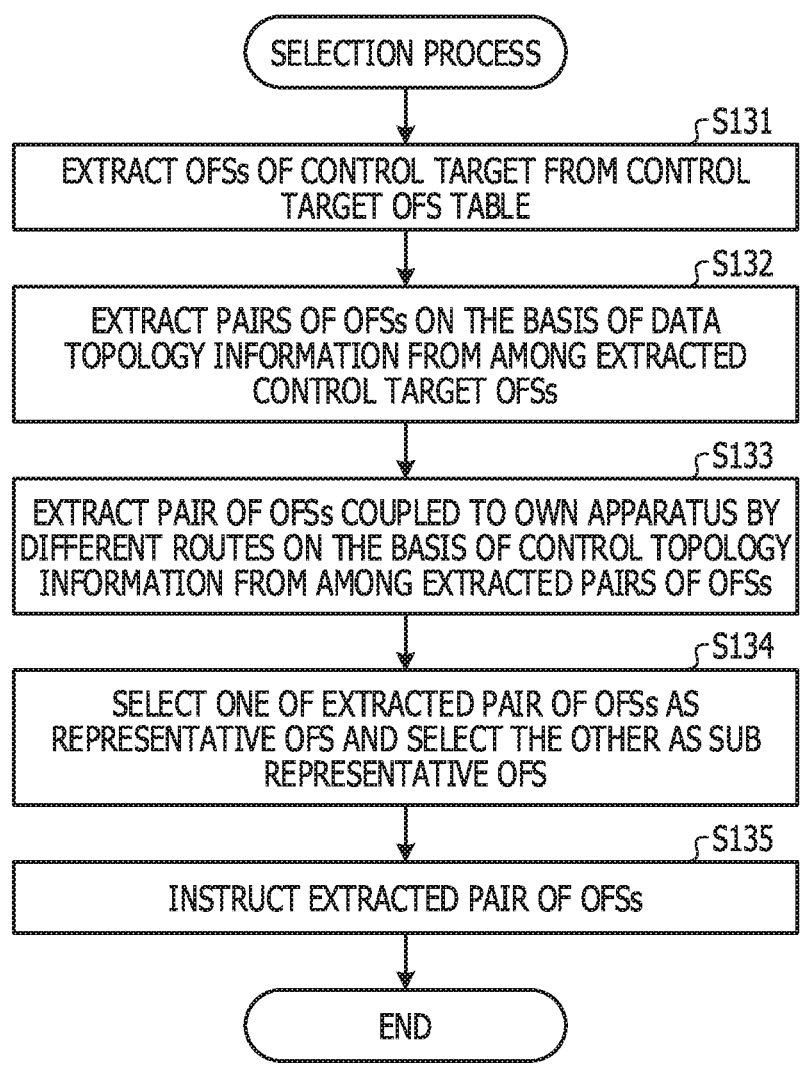
FIG. 12 is a flow chart illustrating an example of processing operation of a primary OFC relating to a selection process.

Operation of the communication system 1A of the embodiment 2 is described below. FIG. 12 is a flow chart illustrating an example of processing operation of the primary OFC 12A relating to a selection process. The selection process depicted in FIG. 12 is a process for selecting the representative OFS 11 and the sub representative OFS 13 from a plurality of pairs of OFSs 2 in the control target OFS table 41D.

Referring to FIG. 12, the selection unit 45 in the primary OFC 12A extracts OFSs 2 of the control target from the control target OFS table 41D (step S131). The selection unit 45 extracts pairs of OFSs 2 on the basis of the data topology information from among the extracted OFSs 2 of the control target (step S132). The selection unit 45 extracts a pair of OFSs 2, which couples to the own apparatus through different routes, from among the extracted pairs of OFSs 2 on the basis of the control topology information (step S133).

Further, the selection unit 45 selects one of the extracted pair of OFSs 2 as the representative OFS 11 and selects the other as the sub representative OFS 13 (step S134). The instruction unit 46 instructs the selected one OFS 2 to operate as the representative OFS 11 and instructs the other OFS 2 to operate as the sub representative OFS 13 (step S135), thereby ending the processing operation depicted in FIG. 12. As a result, the primary OFC 12A selects the representative OFS 11 and the sub representative OFS 13 from among the OFSs 2 of the control target.

Figure 14:
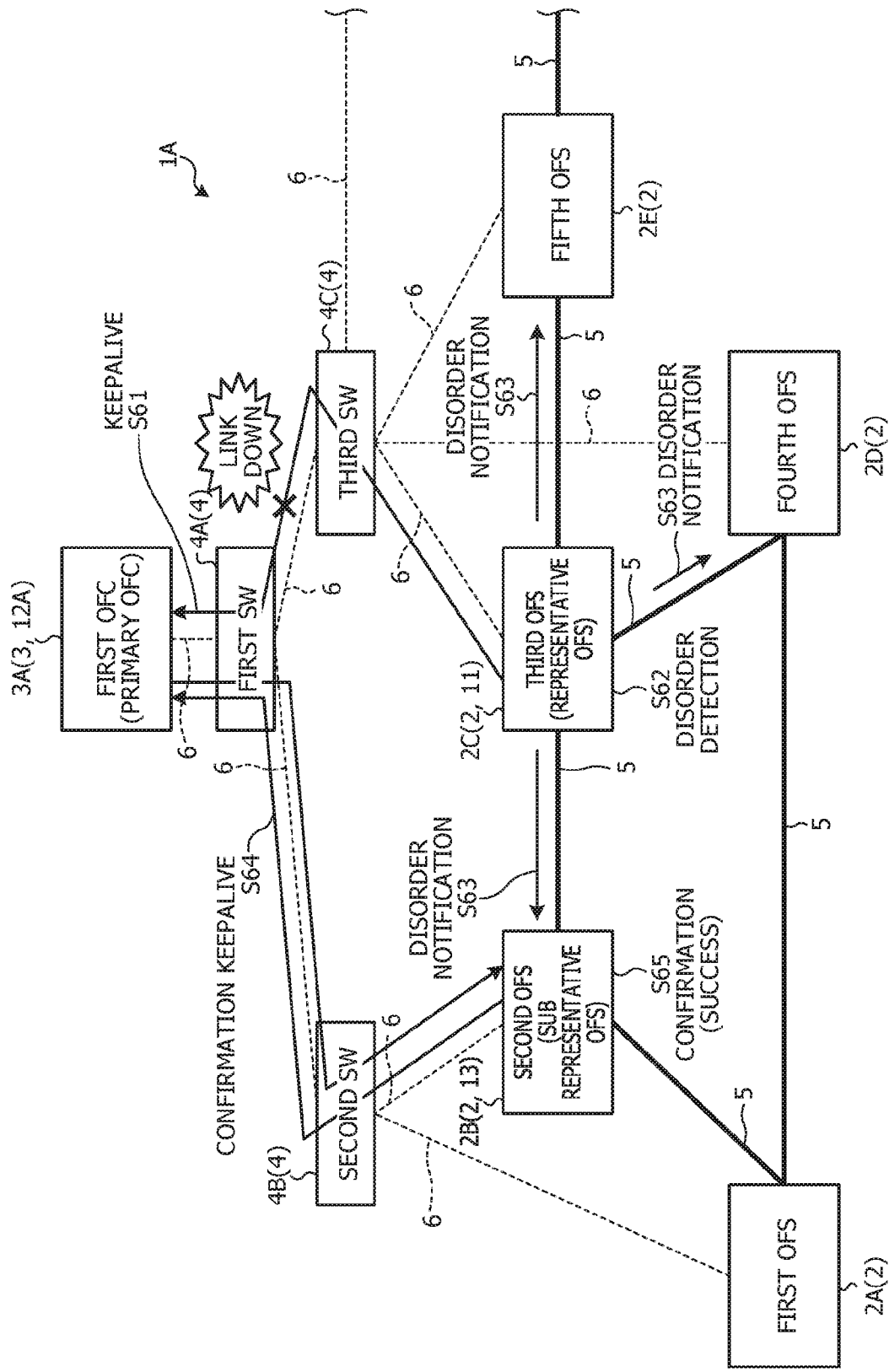
FIG. 14 depicts an example of operation upon success in confirmation keepalive of a sub representative OFS in a communication system of the embodiment 2.

FIG. 13 is an explanatory view depicting an example of operation upon failure in confirmation keepalive of the sub representative OFS 13 in the communication system 1A of the embodiment 2, and FIG. 14 is an explanatory view depicting an example of operation upon success in confirmation keepalive of the sub representative OFS 13 in the communication system 1A of the embodiment 2. It is to be noted that, for the convenience of description, it is assumed that the first OFC 3A serves as the primary OFC 12A; the third OFS 2C serves as the representative OFS 11; and the second OFS 2B serves as the sub representative OFS 13.

Referring to FIG. 13, the third OFS 2C serving as the representative OFS 11 executes keepalive for the first OFC 3A using the control plane 6 through the first SW 4A and the third SW 4C (step S51). Further, if a disorder of the first OFC 3A is detected on the basis of a result of the keepalive (step S52), then the third OFS 2C transmits a disorder notification representative of the disorder of the first OFC 3A by flooding transmission using the data plane 5 (step S53). In other words, the third OFS 2C issues a disorder notification to the second OFS 2B, fourth OFS 2D and fifth OFS 2E. As a result, the third OFS 2C, fourth OFS 2D and fifth OFS 2E execute OFC switching operation for switching the primary OFC 12A to the second OFC 3B and switching the secondary OFC 12B to the first OFC 3A.

If the second OFS 2B serving as the sub representative OFS 13 receives a disorder notification from the third OFS 2C, then the second OFS 2B executes confirmation keepalive for the first OFC 3A using the control plane 6 through the first SW 4A and the second SW 4B (step S54). Further, if the second OFS 2B detects a failure of the confirmation keepalive (step S55), then the second OFS 2B notifies the OFS 2, which has not been notified of the notification of the disorder, of a disorder notification representative of the disorder of the first OFC 3A itself using the data plane 5 (step S56). In other words, the second OFS 2B notifies the first OFS 2A, which has not been notified of the notification of the disorder, of the disorder notification. As a result, the second OFS 2B and the first OFS 2A execute OFC switching operation for switching the primary OFC 12A to the second OFC 3B and switching the secondary OFC 12B to the first OFC 3A.

In FIG. 14, the third OFS 2C executes keepalive for the first OFC 3A using the control plane 6 through the first SW 4A and the third SW 4C (step S61). Further, if a disorder of the first OFC 3A is detected on the basis of a result of the keepalive (step S62), then the third OFS 2C transmits a disorder notification indicative of the disorder of the first OFC 3A by flooding transmission using the data plane 5 (step S63). In other words, the third OFS 2C notifies the second OFS 2B, fourth OFS 2D and fifth OFS 2E of the disorder notification. As a result, the third OFS 2C, fourth OFS 2D and fifth OFS 2E execute OFC switching operation for switching the primary OFC 12A to the second OFC 3B and switching the secondary OFC 12B to the first OFC 3A.

If the second OFS 2B serving as the sub representative OFS 13 receives the disorder notification from the third OFS 2C, then the second OFS 2B executes confirmation keepalive for the first OFC 3A using the control plane 6 through the first SW 4A and the second SW 4B (step S64). Further, if a success of the confirmation keepalive is detected (step S65), then the second OFS 2B decides that the disorder does not indicate a disorder of the first OFC 3A itself but indicates link down on the control plane 6.

The second OFS 2B decides that the first OFC 3A is normal. As a result, the first OFS 2A and the second OFS 2B maintain the first OFC 3A as the primary OFC 12A.

In the case of FIG. 14, since the first OFC 3A itself does not suffer from a disorder but the disorder is link down between the first SW 4A and the third SW 4C on the control plane 6, the confirmation keepalive executed by the sub representative OFS 13 results in success. Accordingly, the sub representative OFS 13 decides that the disorder is not a disorder of the primary OFC 12A itself but is link down on the control plane 6 between the third OFS 2C serving as the representative OFS 11 and the first OFC 3A. Further, since there is no influence on the coupling between the first and second OFSs 2A and 2B and the first OFC 3A, the sub representative OFS 13 does not execute switching to the secondary OFC 12B and disorder notification to the first OFS 2A.

Figure 15:
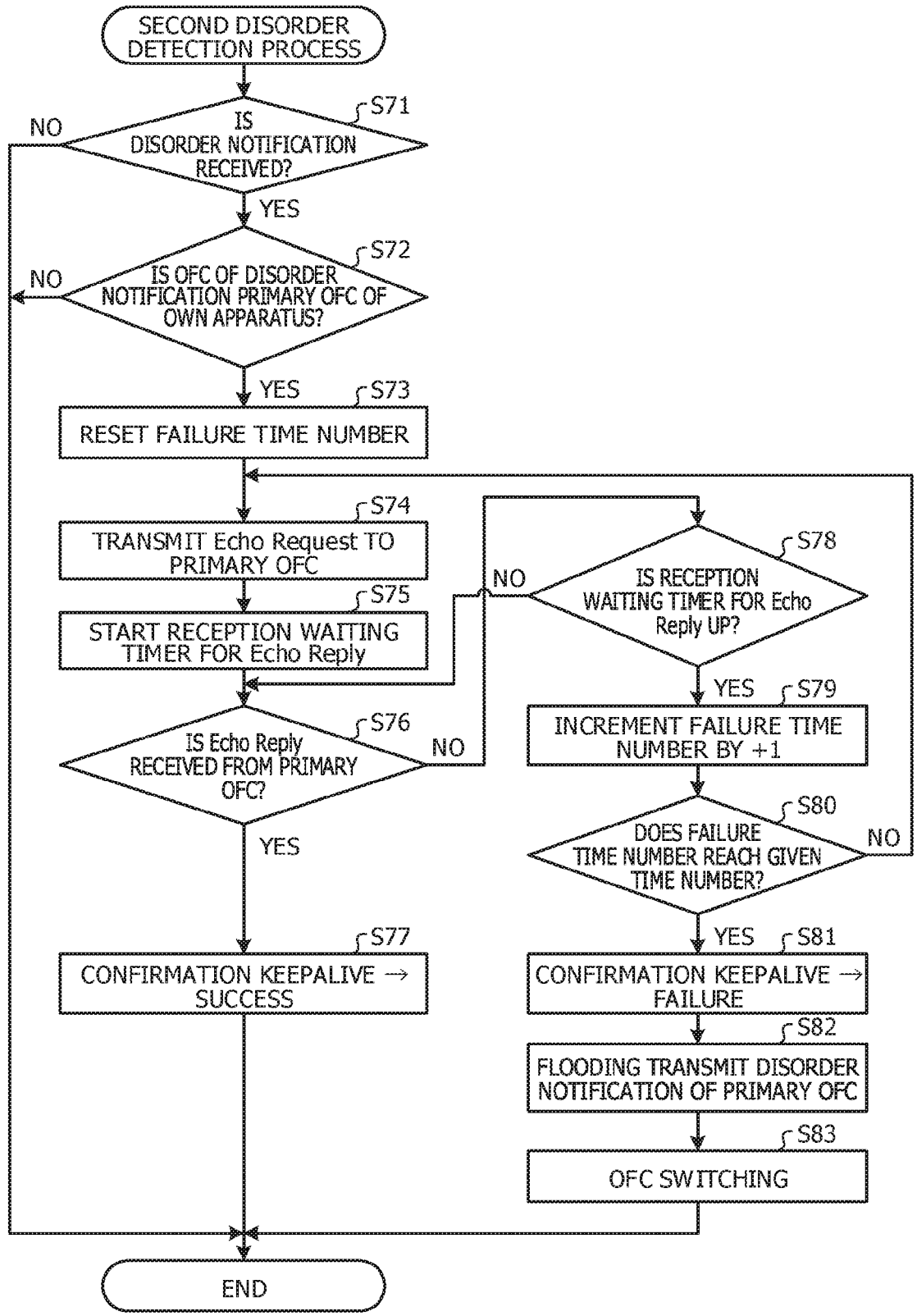
FIG. 15 is a flow chart illustrating an example of processing operation of a sub representative OFS relating to a second disorder detection process.

FIG. 15 is a flow chart illustrating an example of processing operation of the sub representative OFS 13 relating to a second disorder detection process. The second disorder detection process depicted in FIG. 15 is a process of executing, when a disorder notification from the representative OFS 11 is detected, confirmation keepalive for the primary OFC 12A from the sub representative OFS 13. It is to be noted that the representative OFS 11 executes the first disorder detection process depicted in FIG. 8 in order to execute keepalive with the primary OFC 12A.

Referring to FIG. 15, the reception unit 35C in the sub representative OFS 13 decides whether or not a disorder notification is received using the data plane 5 (step S71). If a disorder notification is received (Yes at step S71), then the sub representative OFS 13 decides whether or not the OFC 3 of the disorder notification is the primary OFC 12A of the own apparatus (step S72).

If the OFC 3 of the disorder notification is the primary OFC 12A of the own apparatus (Yes at step S72), then the monitoring unit 34B in the sub representative OFS 13 resets the failure time number for the Echo Reply (step S73). The monitoring unit 34B transmits an Echo Request for the confirmation keepalive to the primary OFC 12A of the own apparatus using the control plane 6 (step S74). The detection unit 34C in the sub representative OFS 13 starts, after the transmission of the Echo Request, the reception waiting timer for the Echo Reply (step S75) and decides whether or not an Echo Reply is received from the primary OFC 12A (step S76). If an Echo Reply is received (Yes at step S76), then the detection unit 34C decides that the confirmation keepalive results in success (step S77), thereby ending the processing operation depicted in FIG. 15.

On the other hand, if an Echo Reply is not received from the primary OFC 12A (No at step S76), then the detection unit 34C decides whether or not the reception waiting timer is up (step S78). If the reception waiting timer is up (Yes at step S78), then the detection unit 34C increments the failure time number by +1 (step S79) and decides whether or not the failure time number reaches a given time number (step S80).

If the failure time number reaches the given time number (Yes at step S80), then the detection unit 34C decides that the confirmation keepalive results in failure (step S81). If it is decided that the confirmation keepalive results in failure, then the transmission unit 35B transmits a disorder notification of the primary OFC 12A by flooding transmission (step S82). Further, after the flooding transmission of the disorder notification, the switching unit 35A executes OFC switching operation (step S83), thereby ending the processing operation depicted in FIG. 15.

If the reception waiting timer is not up (No at step S78), then the detection unit 34C advances the processing to step S76 in order to decide whether or not an Echo Reply is received from the primary OFC 12A. If the failure time number does not reach the given time number (No at step S80), then the monitoring unit 34B advances its processing to step S74 in order to transmit an Echo Request for confirmation keepalive to the primary OFC 12A again.

If a disorder notification is not received (No at step S71), then the reception unit 35C ends the processing operation depicted in FIG. 15. On the other hand, if the detection unit 34C decides that the OFC 3 of the disorder notification is not the primary OFC 12A of the own apparatus (No at step S72), then the processing operation depicted in FIG. 15 is ended.

If the sub representative OFS 13 that executes the second disorder detection process depicted in FIG. 15 receives a disorder notification from the representative OFS 11, then the sub representative OFS 13 executes confirmation keepalive with the primary OFC 12A. If the sub representative OFS 13 receives an Echo Reply before the reception waiting timer becomes up, then the sub representative OFS 13 decides that the confirmation keepalive results in success. As a result, the sub representative OFS 13 recognizes that the disorder is not a disorder of the primary OFC 12A itself but is link down of the control plane 6.

If the failure time number reaches the given time number, then the sub representative OFS 13 decides that confirmation keepalive results in failure. As a result, the sub representative OFS 13 confirms occurrence of a disorder in the primary OFC 12A itself.

If the sub representative OFS 13 decides that the confirmation keepalive results in failure, then the sub representative OFS 13 transmits a disorder notification including the identifier for identifying the disordered primary OFC 12A by flooding transmission. As a result, the OFSs 2 neighboring with the sub representative OFS 13 recognize the occurrence of the disorder in the primary OFC 12A.

In the embodiment 2, not only the representative OFS 11 but also the sub representative OFS 13 are selected taking topology information of the data plane 5 and the control plane 6 into consideration, and when a disorder notification is received from the representative OFS 11, the sub representative OFS 13 executes confirmation keepalive. Then, if the confirmation keepalive results in failure, then the sub representative OFS 13 decides that the disorder is a disorder of the primary OFC 12A itself. As a result, the sub representative OFS 13 confirms the disorder of the primary OFC 12A itself.

On the other hand, if the confirmation keepalive results in success, then the sub representative OFS 13 decides that the disorder is not a disorder of the primary OFC 12A itself but is link down on the control plane 6. As a result, the sub representative OFS 13 identifies not a disorder of the primary OFC 12A itself but link down on the control plane 6.

If the representative OFS 11 in the embodiment 2 detects a disorder of the primary OFC 12A, then the representative OFS 11 executes confirmation keepalive from the sub representative OFS 13 to the primary OFC 12A after flooding transmission of a disorder notification. However, after a result of the confirmation keepalive of the sub representative OFS 13, the representative OFS 11 may transmit a disorder notification on the basis of the result of the confirmation from the sub representative OFS 13. An embodiment in this case is described below as an embodiment 3. It is to be noted that like elements to those of the communication system 1A of the embodiment 2 are denoted by like reference symbols, and overlapping description of the elements and operation of them is omitted.

Embodiment 3

A communication system 1B of the embodiment 3 is different from the communication system 1A of the embodiment 2 in that, when the representative OFS 11 detects a disorder of the primary OFC 12A, the representative OFS 11 requests the sub representative OFS 13 to confirm keepalive and transmits a disorder notification on the basis of a result of the confirmation. In other words, when the representative OFS 11 detects a disorder of the primary OFC 12A, the representative OFS 11 does not transmit a disorder notification by flooding transmission immediately but requests the sub representative OFS 13 for confirmation.

Figure 16:
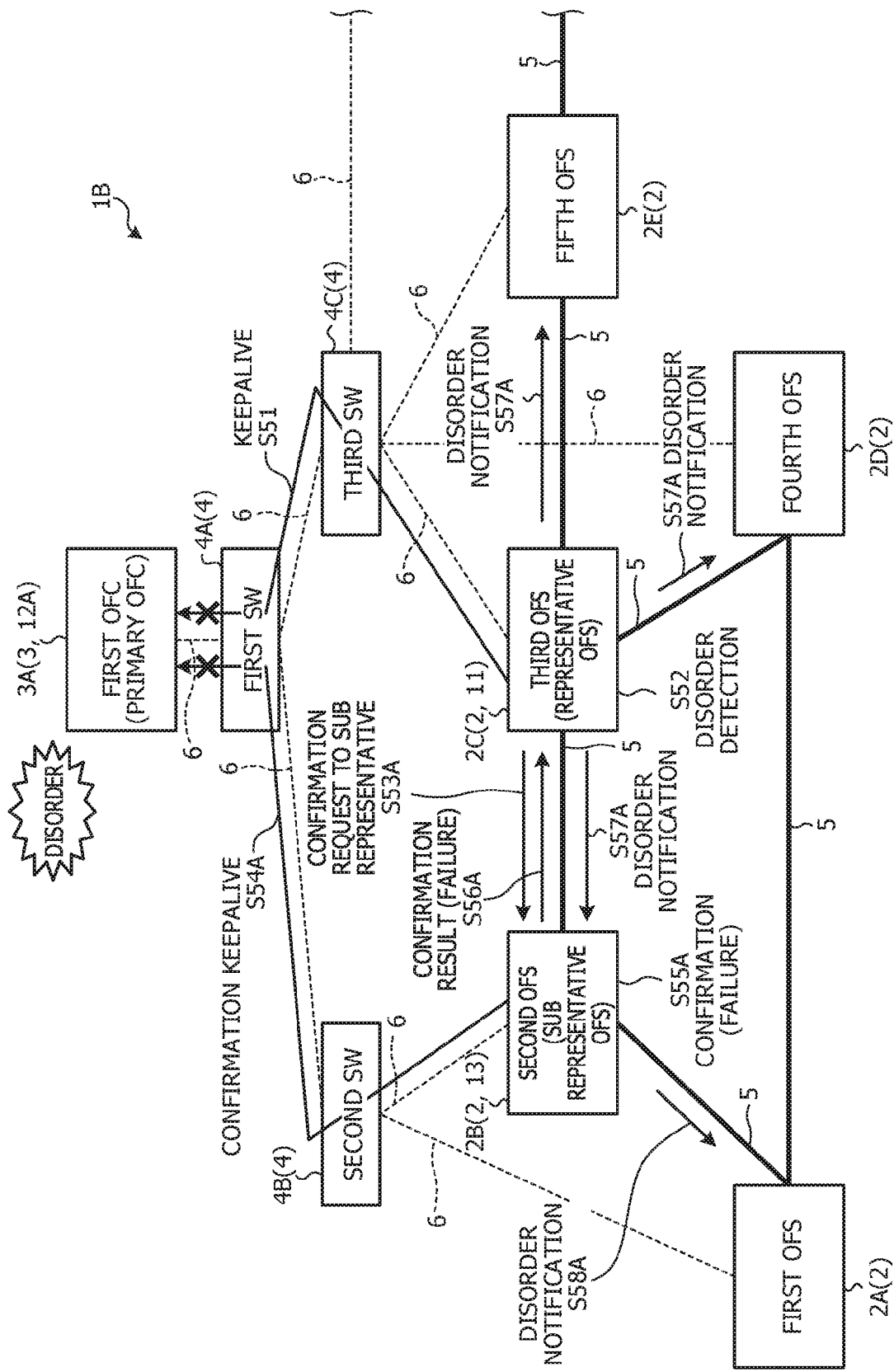
FIG. 16 depicts an example of operation upon failure in confirmation keepalive of a sub representative OFS in a communication system of an embodiment 3.
Figure 17:
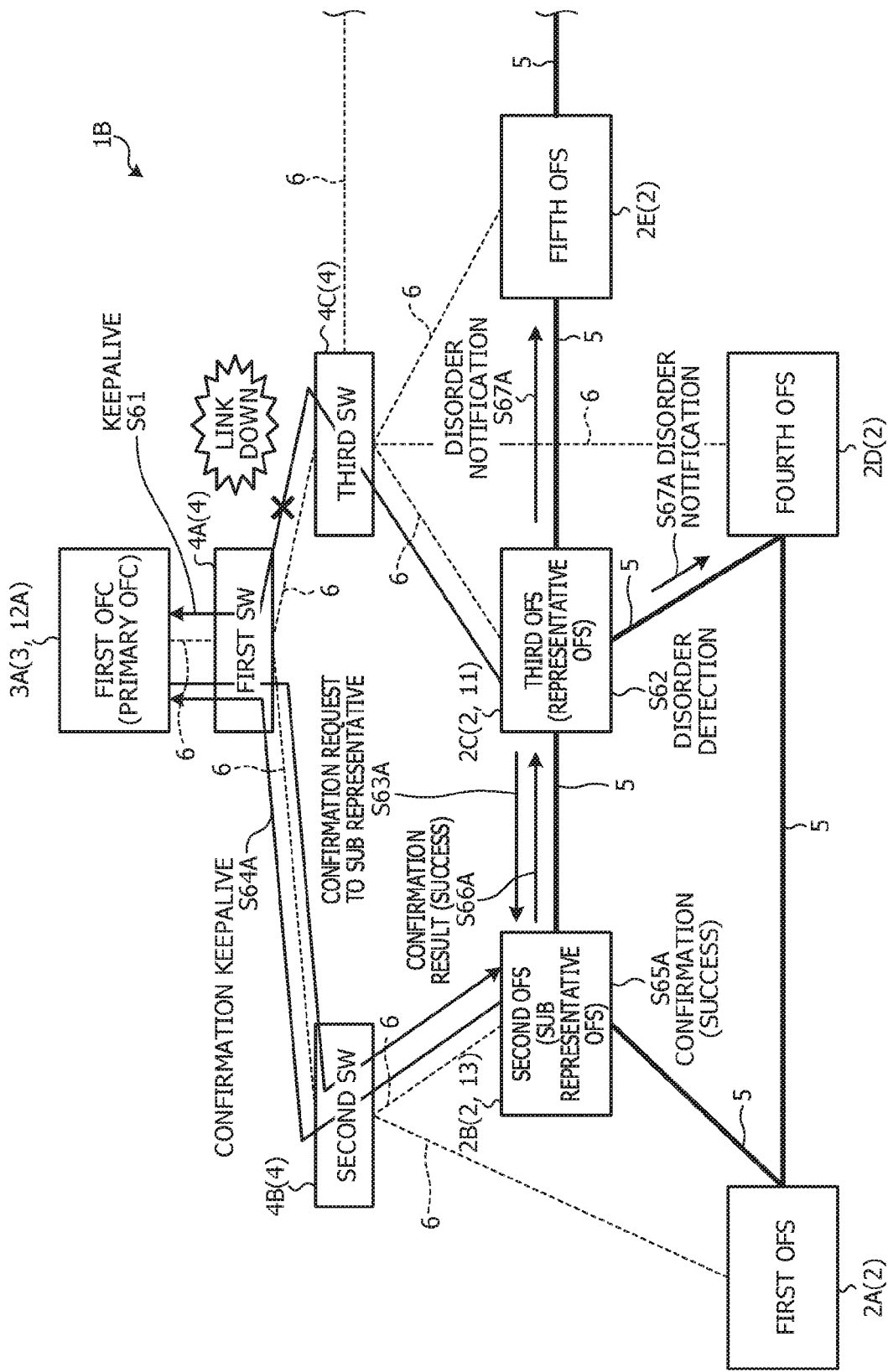
FIG. 17 depicts an example of operation upon success in confirmation keepalive of a sub representative OFS in a communication system of the embodiment 3.

Now, operation of the communication system 1B of the embodiment 3 is described. FIG. 16 is an explanatory view depicting an example of operation upon failure in confirmation keepalive of the sub representative OFS 13 in the communication system 1B of the embodiment 3. Meanwhile, FIG. 17 is an explanatory view depicting an example of operation upon success in confirmation keepalive of the sub representative OFS 13 in the communication system 1B of the embodiment 3. It is to be noted that, for the convenience of description, it is assumed that the first OFC 3A serves as the primary OFC 12A; the third OFS 2C serves as the representative OFS 11; and the second OFS 2B serves as the sub representative OFS 13.

Referring to FIG. 16, the third OFS 2C serving as the representative OFS 11 executes keepalive for the first OFC 3A using the control plane 6 through the first SW 4A and the third SW 4C (step S51). Further, if the third OFS 2C detects a disorder of the first OFC 3A on the basis of a result of the keepalive (step S52), then the third OFS 2C notifies the second OFS 2B serving as the sub representative OFS 13 of a confirmation request using the data plane 5 (step S53A). It is to be noted that the third OFS 2C explicitly sets an output port to the sub representative OFS 13 in order to notify the sub representative OFS 13 of a confirmation request.

If the second OFS 2B receives the confirmation request, then it executes confirmation keepalive for the first OFC 3A using the control plane 6 through the first SW 4A and the second SW 4B (step S54A). Further, if the second OFS 2B decides that the confirmation keepalive results in failure (step S55A), then the second OFS 2B notifies the third OFS 2C of the confirmation result (failure) using the data plane 5 (step S56A).

In the case of the confirmation result (failure), the third OFS 2C decides that the disorder is a disorder of the first OFC 3A itself and transmits a disorder notification by flooding transmission (step S57A). Further, if the second OFS 2B serving as the sub representative OFS 13 receives the disorder notification from the representative OFS 11, then the second OFS 2B notifies the OFS 2, to which the disorder notification has not been transmitted as yet, of the disorder notification. In other words, the second OFS 2B notifies the first OFS 2A of the disorder notification (step S58A). As a result, the third OFS 2C, fourth OFS 2D and fifth OFS 2E as well as the second OFS 2B and first OFS 2A execute switching operation of the OFC 3. In other words, the third OFS 2C, fourth OFS 2D and fifth OFS 2E as well as the second OFS 2B and first OFS 2A switch the second OFC 3B to the primary OFC 12A and switch the first OFC 3A to the secondary OFC 12B.

Referring to FIG. 17, the third OFS 2C executes keepalive for the first OFC 3A using the control plane 6 through the first SW 4A and the third SW 4C (step S61). Further, if the third OFS 2C detects a disorder of the first OFC 3A on the basis of a result of the keepalive (step S62), then it notifies the second OFS 2B serving as the sub representative OFS 13 of a confirmation request using the data plane 5 (step S63A).

If the second OFS 2B receives the confirmation request, then it executes confirmation keepalive for the first OFC 3A using the control plane 6 through the first SW 4A and the second SW 4B (step S64A). Further, if the second OFS 2B decides that the confirmation keepalive results in success (step S65A), then it notifies the third OFS 2C of the conformation result (success) using the data plane 5 (step S66A).

In the case of the confirmation result (success), the third OFS 2C decides that the disorder is not a disorder of the first OFC 3A itself but is link down on the control plane 6 and transmits a disorder notification by flooding transmission from output ports other than the output port to the second OFS 2B (step S67A). As a result, the third OFS 2C transmits the disorder notification to the fourth OFS 2D and the fifth OFS 2E. The third OFS 2C, fourth OFS 2D and fifth OFS 2E execute switching operation of the OFC 3. In particular, the third OFS 2C, fourth OFS 2D and fifth OFS 2E switch the second OFC 3B to the primary OFC 12A and switch the first OFC 3A to the secondary OFC 12B.

If the second OFS 2B decides that the confirmation keepalive results in success, then it decides that the disorder is not a disorder of the first OFC 3A itself but is link down on the control plane 6. As a result, the first OFS 2A and the second OFS 2B maintain the first OFC 3A as the primary OFC 12A.

In the case of FIG. 17, since the disorder is not a disorder of the first OFC 3A itself but is link down between the first SW 4A and the third SW 4C on the control plane 6, the confirmation keepalive executed by the sub representative OFS 13 is successful. Accordingly, the sub representative OFS 13 decides that the disorder is not a disorder of the first OFC 3A itself but is link down on the control plane 6 between the third OFS 2C serving as the representative OFS 11 and the first OFC 3A. Then, since there is no influence on the coupling between the first and second OFSs 2A and 2B and the first OFC 3A, the sub representative OFS 13 does not execute switching to the secondary OFC 12B and disorder notification to the first OFS 2A.

Figure 18:
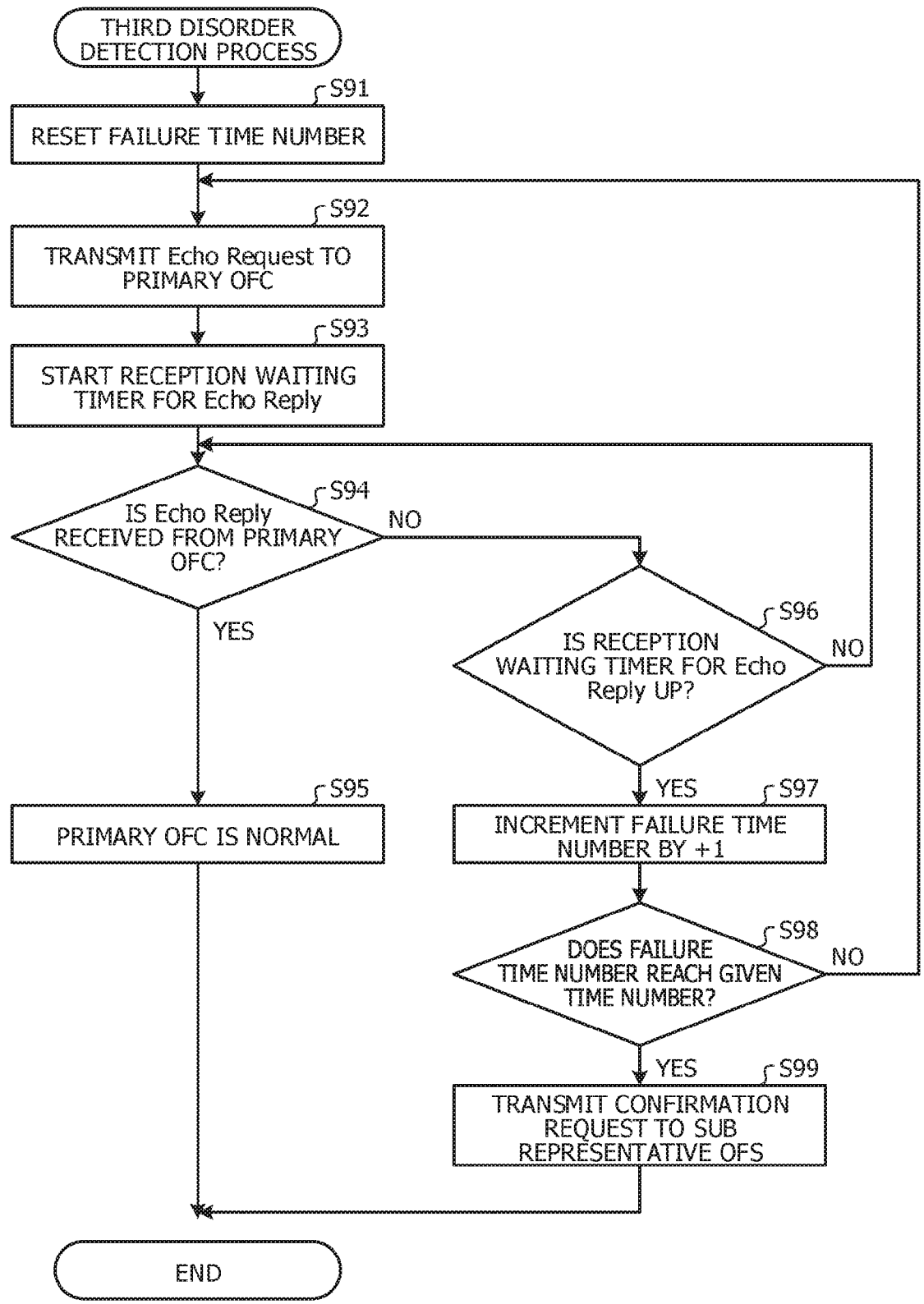
FIG. 18 is a flow chart illustrating an example of processing operation of a representative OFS relating to a third disorder detection process.

FIG. 18 is a flow chart illustrating an example of processing operation of the representative OFS 11 relating to a third disorder detection process. The third disorder detection process depicted in FIG. 18 is a process for executing keepalive with the primary OFC 12A and transmitting, when a disorder of the primary OFC 12A is detected, a confirmation request to the sub representative OFS 13.

Referring to FIG. 18, the monitoring unit 34B in the representative OFS 11 resets the failure time number for the Echo Reply (step S91) and transmits an Echo Request for keepalive to the primary OFC 12A of the own apparatus using the control plane 6 (step S92). After the transmission of the Echo Request, the detection unit 34C starts the reception waiting timer for the Echo Reply (step S93) and decides whether or not an Echo Reply is received from the primary OFC 12A (step S94). If an Echo Reply is received (Yes at step S94), then the detection unit 34C decides that the primary OFC 12A is normal (step S95), thereby ending the processing operation depicted in FIG. 18.

If an Echo Reply is not received from the primary OFC 12A (No at step S94), then the detection unit 34C decides whether or not the reception waiting timer is up (step S96). If the reception waiting timer is up (Yes at step S96), then the detection unit 34C increments the failure time number by +1 (step S97) and decides whether or not the failure time number reaches a given time number (step S98).

If the fail time number reaches the given time number (Yes at step S98), then the transmission unit 35B transmits a confirmation request including the identifier of the disordered OFC 3 to the sub representative OFS 13 using the data plane 5 (step S99), thereby ending the processing operation depicted in FIG. 18.

On the other hand, if the reception waiting timer is not up (No at step S96), then the detection unit 34C advances the processing to step S94 in order to decide whether or not an Echo Reply is received from the primary OFC 12A. If the failure time number does not reach the given time number (No at step S98), then the transmission unit 35B advances the processing to step S92 in order to transmit an Echo Request to the primary OFC 12A.

The representative OFS 11 that executes the third disorder detection process depicted in FIG. 18 notifies, when the failure time number reaches the given time number, the sub representative OFS 13 of a confirmation request. As a result, the representative OFS 11 issues a confirmation request of a disorder of the primary OFC 12A to the sub representative OFS 13.

Figure 19:
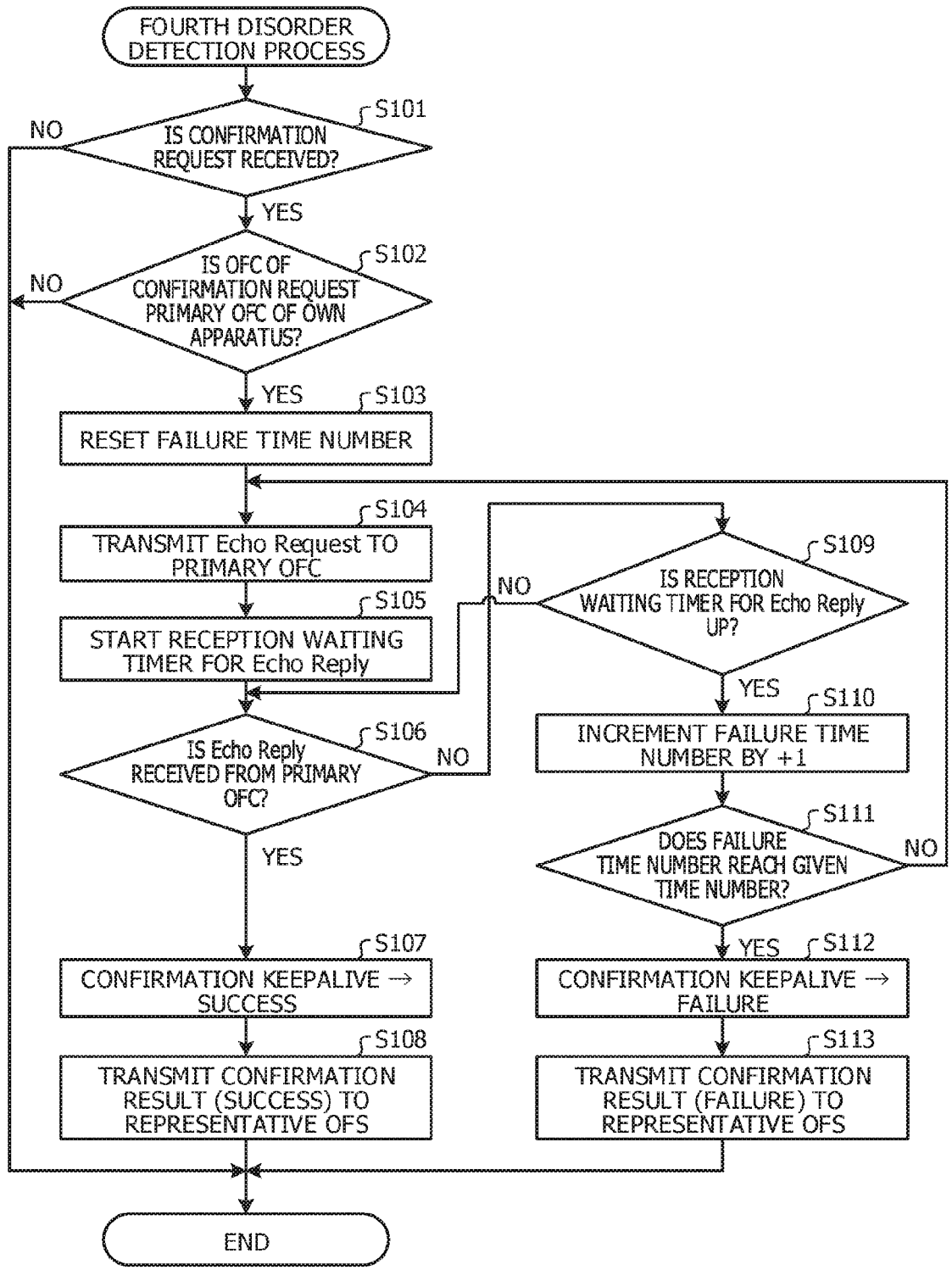
FIG. 19 is a flow chart illustrating an example of processing operation of a sub representative OFS relating to a fourth disorder detection process.

FIG. 19 is a flow chart illustrating an example of processing operation of the sub representative OFS 13 relating to a fourth disorder detection process. The fourth disorder detection process depicted in FIG. 19 is a process for executing, when a confirmation request from the representative OFS 11 is detected, confirmation keepalive with the primary OFC 12A.

Referring to FIG. 19, the reception unit 35C of the sub representative OFS 13 decides whether or not a confirmation request is received using the data plane 5 (step S101). If a confirmation request is received (Yes at step S101), then the detection unit 34C in the sub representative OFS 13 decides whether or not the OFC 3 of the confirmation request is the primary OFC 12A of the own apparatus (step S102).

If the OFC 3 of the confirmation request is the primary OFC 12A of the own apparatus (Yes at step S102), then the monitoring unit 34B resets the failure time number for the Echo Reply (step S103). Further, the monitoring unit 34B transmits an Echo Request for confirmation keepalive to the primary OFC 12A of the own apparatus using the control plane 6 (step S104). After the transmission of the Echo Request, the detection unit 34C starts the reception waiting timer (step S105) and decides whether or not an Echo Reply is received from the primary OFC 12A (step S106). If an Echo Reply is received (Yes at step S106), then the detection unit 34C decides that the conformation keepalive results in success (step S107). When it is decided that the conformation keepalive results in success, then the transmission unit 35B notifies the representative OFS 11 of the confirmation result (success) using the data plane 5 (step S108), thereby ending the processing operation depicted in FIG. 19.

If an Echo Reply is not received from the primary OFC 12A (No at step S106), then the detection unit 34C decides whether or not the reception waiting timer is up (step S109). If the reception waiting timer is up (Yes at step S109), then the detection unit 34C increments the failure time number by +1 (step S110) and decides whether or not the failure time number reaches a given time number (step S111).

If the failure time number reaches the given time number (Yes at step S111), then the transmission unit 35B decides that the confirmation keepalive results in failure (step S112). When it is decided that the confirmation keepalive results in failure, the transmission unit 35B notifies the representative OFS 11 of the confirmation result (failure) using the data plane 5 (step S113), thereby ending the processing operation depicted in FIG. 19.

On the other hand, if the reception waiting timer is not up (No at step S109), then the detection unit 34C advances the processing to step S106 in order to decide whether or not an Echo Reply is received from the primary OFC 12A. If the failure time number does not reach the given time number (No at step S111), then the monitoring unit 34B advances the processing to step S104 in order to transmit the Echo Request for the confirmation keepalive to the primary OFC 12A again.

If the reception unit 35C does not receive a confirmation request (No at step S101), then the processing operation depicted in FIG. 19 is ended. If the OFC 3 of the confirmation request is not the primary OFC 12A of the own apparatus (No at step S102), then the sub representative OFS 13 ends processing operation depicted in FIG. 19.

If the sub representative OFS 13 that executes the fourth disorder detection process depicted in FIG. 19 detects a confirmation request from the representative OFS 11, then the sub representative OFS 13 executes confirmation keepalive with the primary OFC 12A. If the sub representative OFS 13 receives an Echo Reply before the reception waiting timer becomes up, the sub representative OFS 13 decides that the confirmation keepalive results in success. As a result, the sub representative OFS 13 recognizes that the disorder is not a disorder of the primary OFC 12A itself but is link down of the control plane 6.

If the failure time number reaches the given time number, then the sub representative OFS 13 decides that the confirmation keepalive results in failure. As a result, the sub representative OFS 13 confirms the disorder occurrence of the primary OFC 12A itself.

Further, the sub representative OFS 13 notifies the representative OFS 11 of the confirmation keepalive result as a confirmation result. As a result, the representative OFS 11 recognizes the confirmation keepalive result on the basis of the confirmation result from the sub representative OFS 13.

Figure 20:
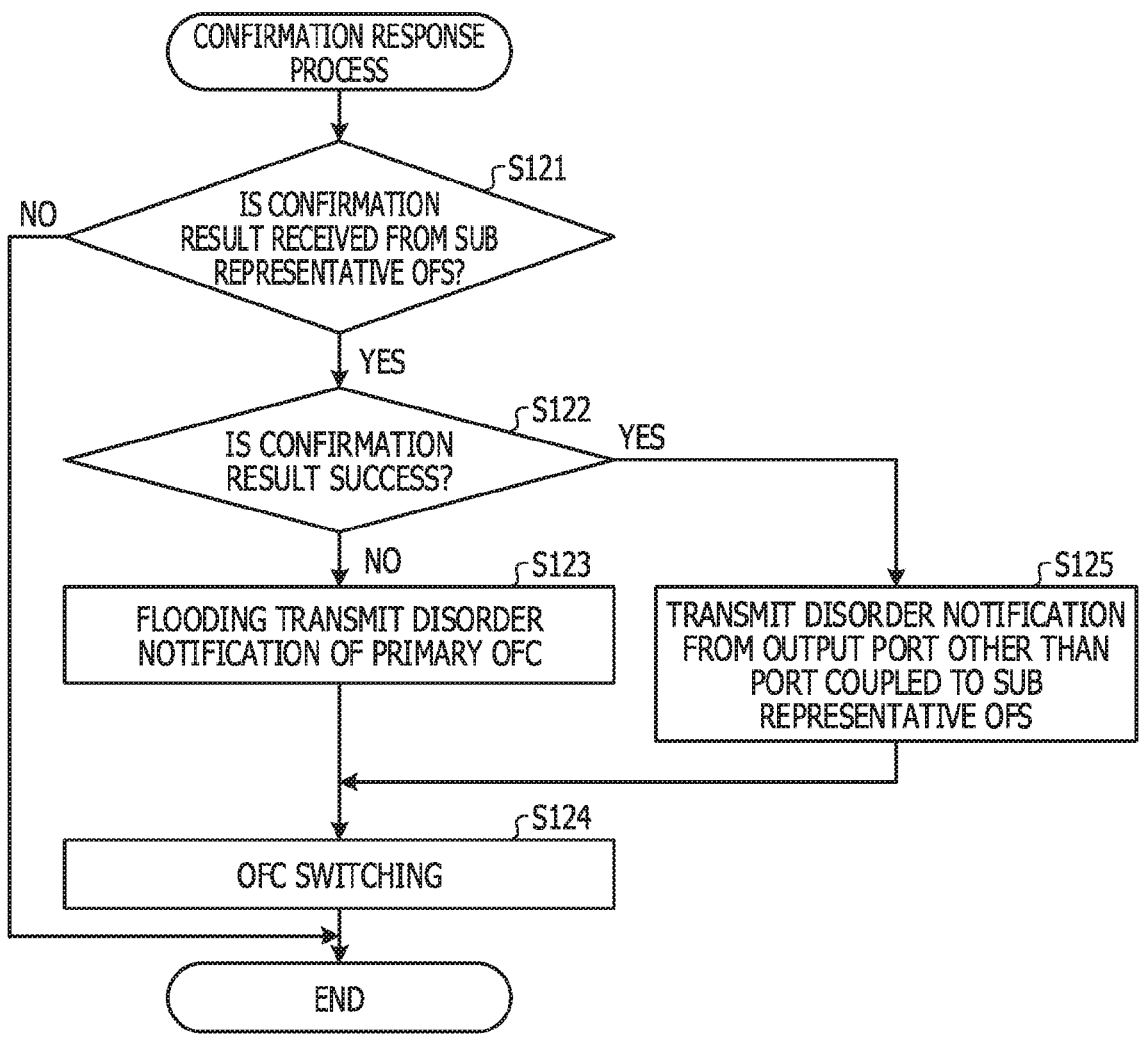
FIG. 20 is a flow chart depicting an example of processing operation of a representative OFS relating to a confirmation response process.

FIG. 20 is a flow chart illustrating an example of processing operation of the representative OFS 11 relating to a confirmation response process. The confirmation response process illustrated in FIG. 20 is a process for confirming a disorder of the primary OFC 12A on the basis of a confirmation result from the sub representative OFS 13.

Referring to FIG. 20, the reception unit 35C in the representative OFS 11 decides whether or not a confirmation result is received from the sub representative OFS 13 using the data plane 5 (step S121). If a confirmation result is received (Yes at step S121), then the reception unit 35C decides whether or not the confirmation result is "success" (step S122).

If the confirmation result is not "success" (No at step S122), then the transmission unit 35B decides that the confirmation result is "failure" and transmits a disorder notification indicative of a disorder of the primary OFC 12A by flooding transmission (step S123). Further, the switching unit 35A executes switching operation of the OFC 3 (step S124), thereby ending the processing operation illustrated in FIG. 20. In other words, the representative OFS 11 switches the second OFC 3B to the primary OFC 12A and switches the first OFC 3A to the secondary OFC 12B.

If the confirmation result is "success" (Yes at step S122), then the transmission unit 35B transmits a disorder notification from output ports other than the port coupled to the sub representative OFS 13 (step S125). Further, the switching unit 35A executes switching operation of the OFC 3 (step S124), thereby ending the processing operation illustrated in FIG. 20. In particular, the representative OFS 11 and the fourth OFS 2D and fifth OFS 2E of the ports coupled to the representative OFS 11 execute switching operation of the OFC 3 in response to the disorder notification. The representative OFS 11, fourth OFS 2D and fifth OFS 2E switch the second OFC 3B to the primary OFC 12A and switch the first OFC 3A to the secondary OFC 12B.

If the reception unit 35C does not receive a confirmation result to the confirmation request from the sub representative OFS 13 (No at step S121), then the reception unit 35C ends the processing operation depicted in FIG. 20.

The representative OFS 11 that executes the confirmation response process depicted in FIG. 20 recognizes, if the confirmation result from the sub representative OFS 13 is success, that the disorder is not a disorder of the primary OFC 12A itself but is link down on the control plane 6.

If the confirmation result from the sub representative OFS 13 is failure, then the representative OFS 11 re-confirms that the disorder is a disorder of the primary OFC 12A itself and transmits a notification of the disorder of the primary OFC 12A by flooding transmission. As a result, the representative OFS 11 notifies the neighboring OFSs 2 of the disorder of the primary OFC 12A. Then, each of the OFSs 2 receives the disorder notification and executes, if the disordered OFC 3 of the disorder notification is the primary OFC 12A of the own apparatus, switching operation of the OFC. As a result, the OFC 3 that controls the own apparatus is recovered from the disorder.

It is to be noted that the representative OFS 11 in the embodiments described above increments the failure time number by +1 when the reception waiting timer for the Echo Reply becomes up and then decides that the primary OFC 12A is disordered when the failure time number reaches the given time number. However, the representative OFS 11 may decide that the primary OFC is in disorder when the reception waiting timer for the Echo Reply becomes up without incrementing the failure time number.

Although a case in which the representative OFS 11 transmits a disorder notification by flooding transmission is exemplified, the disorder notification may be transmitted otherwise to an OFS 2 or OFSs 2 set in advance. For example, if the primary OFC 12A of the fifth OFS 2E is switched not to the first OFC 3A but to the second OFC 3B, then transmission of the notification message to the fifth OFS 2E is unnecessary. Accordingly, the third OFS 2C is set in advance such that it transmits a notification message to two output ports coupled to the second OFS 2B and the fourth OFS 2D.

Also the transmission of a disorder notification of each OFS 2 is not limited to flooding transmission, and a disorder notification may be transferred by explicitly setting output ports of a transfer destination to the OFSs 2 in advance. For example, since a disorder notification has been transferred from the second OFS 2B to the first OFS 2A, the fourth OFS 2D need not transfer the disorder notification to the first OFS 2A. Accordingly, an output port to the first OFS 2A is designated in order to transfer the disorder notification only to the second OFS 2B.

The transmission period for transmitting an Echo Request for keepalive may be set equal to the time-up time period of the reception waiting timer for the Echo Reply and can be changed suitably. For example, if the transmission period and the time-up time period of the reception waiting timer are set equally to 30 milliseconds, then an Echo Request message is transmitted in the period of 30 milliseconds, and it is monitored whether or not an Echo Reply to each transmitted Echo Request can be received within 30 milliseconds by the representative OFS 11. Further, when it is desired to detect a reception failure of an Echo Reply earlier, for example, the reception waiting timer for the Echo Reply may be set to 10 milliseconds. In this case, if it is difficult to receive an Echo Reply within 10 milliseconds after transmission of an Echo Request, then failure in reception is decided. Therefore, the time period before an OFC disorder is detected is reduced. It is to be noted that this can be applied not only to the representative OFS 11 but also to the sub representative OFS 13.

For example, it is assumed that, in the embodiments, link down occurs between the first OFS 2A or second OFS 2B and the second SW 4B on the control plane 6 or between the first SW 4A and the second SW 4B. In this case, one or both of the first OFS 2A and the second OFS 2B are disabled for coupling to the first OFC 3A. Further, also a path for coupling to the other secondary OFC 12B such as the second OFC 3B and so forth disappears from the control plane 6. Therefore, manual recovery by an administrator or the like from the disorder may be required.

For example, it is assumed that, in the embodiments described hereinabove, link down occurs between the third SW 4C and the third OFS 2C, fourth OFS 2D or fifth OFS 2E. In this case, any OFS 2 coupled to the link that suffers from the disorder is disabled for coupling to the first OFC 3A. In this case, also it is disabled to couple to the other secondary OFC 12B such as the second OFC 3B and so forth through the third SW 4C in the control plane 6. Therefore, manual recovery by an administrator or the like from the disorder may be required. It is to be noted that, if the link between the third OFS 2C serving as the representative OFS 11 and the third SW 4C is disordered, then the third OFS 2C comes to detect link down between the third OFS 2C and the third SW 4C before it is disabled to perform keepalive for the first OFC 3A. If the third OFS 2C detects that the disorder is not a disorder of the first OFC 3A itself but is link down of the control plane 6, then only the third OFS 2C itself is disabled for coupling to the first OFC 3A. Accordingly, the third OFS 2C decides that the disorder does not have an influence on the coupling between the neighboring first, second, fourth and fifth OFSs 2A, 2B, 2D and 2E and the first OFC 3A, and does not transmit an OFC disorder detection notification from any output port.

The selection unit 45 in the embodiments described above selects, as the representative OFS 11, on the basis of the control topology information, the OFS 2 whose route cost is the lowest taking the hop number and the distance on the control plane 6 to the primary OFC 12A into consideration. However, the selection unit 45 may select, as the representative OFS 11, for example, an OFS 2 whose identifier or address is lowest in value or an OFS 2 that is located in the proximity of the center among all OFSs 2 on the data plane 5 on the basis of the data topology information. Alternatively, the selection unit 45 may select an OFS 2 at random from within the control target OFS table 41C and select the selected OFS 2 as the representative OFS 11.

Further, the configuration elements of the components depicted in the figures need not necessarily be configured physically in such a manner as depicted in the figures. In other words, the particular forms of disintegration or integration of the components are not limited to those in the figures, but all or some of the components may be configured in a functionally or physically disintegrated or integrated form in an arbitrary unit in response to various loads, situations in use and so forth.

Further, all or arbitrary ones of the various processing functions performed by the various apparatuses may be executed on a CPU, a digital signal processor (DSP), a field programmable gate array (FPGA) or the like. Alternatively, all or arbitrary ones of the various processing functions may be executed on a program analyzed and executed by a CPU or the like or on hardware by wired logic.

An area for storing various kinds of information may be configured from a read only memory (ROM) or a RAM such as, for example, a synchronous dynamic random access memory (SDRAM), a magnetoresistive random access memory (MRAM) or a non volatile random access memory (NVRAM).

Figure 21:
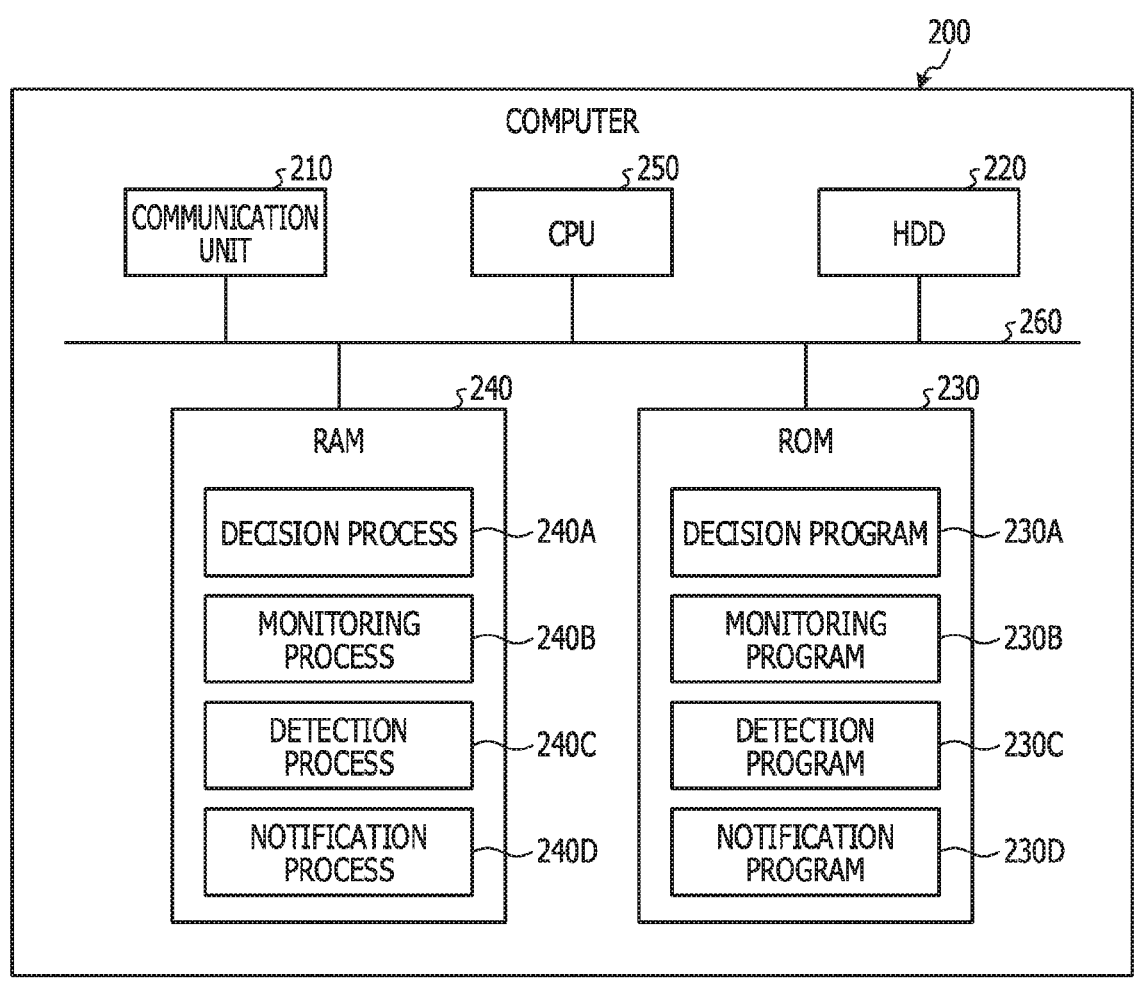
FIG. 21 depicts an example of a computer that executes a disorder detection program.

Incidentally, the various processes described hereinabove in connection with the embodiments may be implemented by causing a processor such as a CPU in a computer to execute a program prepared in advance. Therefore, in the following, an example of an information processing apparatus that executes a program having functions similar to those of the embodiments described above is described. FIG. 21 is an explanatory view depicting an example of a computer that executes a disorder detection program.

Referring to FIG. 21, a computer 200 that executes a disorder detection program includes a communication unit 210, a hard disc drive (HDD) 220, a ROM 230, a RAM 240 and a CPU 250. The communication unit 210, HDD 220, ROM 230, RAM 240 and CPU 250 are coupled to each other by a bus 260. The communication unit 210 couples for communication to a first network and a second network. The first network couples the communication unit 210 to a plurality of switch apparatuses switching a route for data. The second network couples to a control apparatus that controls the plurality of switch apparatuses.

The ROM 230 has stored therein in advance a disorder detection program that demonstrates functions similar to those in the embodiments described hereinabove. The ROM 230 stores therein a decision program 230A, a monitoring program 230B, a detection program 230C and a notification program 230D as disorder detection programs. It is to be noted that such disorder detection programs may be recorded not in the ROM 230 but on a computer-readable recording medium by a drive not depicted. Further, as the recording medium, a portable recording medium such as, for example, a CD-ROM, a DVD disk or a USB memory, a semiconductor memory such as a flash memory or a like memory may be used.

The CPU 250 reads out the decision program 230A from the ROM 230 and causes the decision program 230A to function as a decision process 240A on the RAM 240. Further, the CPU 250 reads out the monitoring program 230B from the ROM 230 and causes the monitoring program 230B to function as a monitoring process 240B on the RAM 240. The CPU 250 reads out the detection program 230C from the ROM 230 and causes the detection program 230C to function as a detection process 240C on the RAM 240. The CPU 250 reads out the notification program 230D from the ROM 230 and causes the notification program 230D to function as a notification process 240D on the RAM 240.

The CPU 250 decides whether or not the own apparatus is the first switch apparatus from among the plurality of switch apparatuses configured to switch the route of data on the first network. Where the own apparatus is the first switch apparatus, the CPU 250 executes keepalive with the control apparatus that controls the plurality of switch apparatuses through the second network different from the first network. The CPU 250 detects a disorder of the control apparatus on the basis of a result of monitoring of the keepalive. If a disorder of the control apparatus is detected, then the CPU 250 notifies the switch apparatus controlled by the control apparatus of a disorder report through the first network. As a result, the communication load on the second network and the processing burden on the control apparatus side when a disorder of the control apparatus is detected is suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system comprising:
a first controller;
a second controller; and
a plurality of switch devices including a first switch device and a second switch device, the plurality of switch devices being configured to receive a packet and store a flow table which indicates a method of handling a process of the received packet,
wherein
the first controller informs a first content of the flow table to the plurality of switch devices,
the first switch device detects a communication error between the first switch device and the first controller,
the first switch device informs the second switch device of the communication error between the first switch device and the first controller, and
the second switch device changes a connecting destination from the first controller to the second controller.

2. The system according to claim 1, wherein
the first controller is a first Openflow Controller,
the second controller is a second Openflow Controller, and
the plurality of switch devices are Openflow Switches.

3. The system according to claim 1, wherein
the first switch device detects the communication error by executing a first keepalive at a regular interval.

4. The system according to claim 3, wherein
the first switch device executes the first keepalive on behalf of the plurality of switch devices, and
the second switch device does not execute the first keepalive.

5. The system according to claim 3, wherein
when the first switch device detects the communication error between the first switch device and the first controller by executing the first keepalive using a first network, the first switch device informs the second switch device of the communication error using a second network.

6. The system according to claim 3, wherein
the plurality of switch devices include a third switch device,
the first switch device informs the third switch device of the communication error between the first switch device and the first controller, and
the third switch device executes a second keepalive in order to detect a communication error between the third switch device and the first controller.

7. The system according to claim 6, wherein
when the third switch device detects the communication error between the third switch device and the first controller, the third switch device informs a fourth switch device included in the plurality of switch devices.

8. The system according to claim 1, wherein
the second controller informs a second content of the flow table to the second switch device, and
the second switch handles the received packet based on the second content.

9. A switch device, comprising:
a memory; and
a processor coupled to the memory and configured to
receive a packet,
receive, from a controller, a content of a flow table which indicates a method of handling a process of the received packet, detect a communication error between the switch device and the controller, and inform the communication error to another switch device.

10. The switch device according to claim 9, wherein
the controller is an Openflow Controller, and
the switch device is an Openflow Switch.

11. The switch device according to claim 9, wherein
the switch device detects the communication error by executing a keepalive at a regular interval.

12. The switch device according to claim 11, wherein
the switch device executes the keepalive on behalf of a plurality of switch devices including the switch device and the another switch device, and
the another switch device does not execute the keepalive.

13. The switch device according to claim 11, wherein
when the switch device detects the communication error by executing the keepalive using a first network, the switch device informs the another switch device of the communication error using a second network.

14. A method of controlling a plurality of switch devices, the method comprising:
storing, in a first switch device and in a second switch device by a first controller, a flow table including a first content which indicates a method of handling process of a packet;
detecting, by the first switch device, a communication error between the first switch device and the first controller;
informing, by the first switch device, the communication error between the first switch device and the first controller to the second switch device;
changing, by the first switch device, a first connection between the second switch device and the first controller to a second connection between the second switch device and a second controller; and
setting, by the second controller, in the first switch device and the second switch device, the flow table including a second content.

15. The method according to claim 14, wherein
the first controller is a first Openflow Controller,
the second controller is a second Openflow Controller, and
the plurality of switch devices are Openflow Switches.

16. The method according to claim 14, wherein
the detecting includes executing a first keepalive at a regular interval.

17. The method according to claim 16, wherein
the executing of the first keepalive is executed by the first switch device on behalf of the plurality of switch devices, and
the method further comprising:
not executing, by the second switch device, the first keepalive.

18. The method according to claim 16, wherein
the executing of the first keepalive is executed using a first network, and
the method further comprising:
when the detecting detects the communication error between the first switch device and the first controller, informing, by the first switch device, the second switch device of the communication error using a second network.

19. The method according to claim 16, further comprising:
receiving, by a third switch device included in the plurality of switch devices, a notification of the communication error between the first switch and the first controller; and
executing, by the third switch device, a second keepalive in order to detect the communication error between the third switch and the first controller.

20. The method according to claim 19, further comprising:
informing, by the third switch device, a fourth switch device included in the plurality of switch devices of the communication error between the third switch and the first controller when detected by the third switch device.

* * * * *